United States Patent [19]

Kumagai

[11] Patent Number: 5,283,866
[45] Date of Patent: Feb. 1, 1994

[54] IMAGE PROCESSING SYSTEM

[75] Inventor: Ryohei Kumagai, Tama, Japan

[73] Assignee: Ezel, Inc., Tokyo, Japan

[21] Appl. No.: 602,379

[22] Filed: Oct. 24, 1990

Related U.S. Application Data

[63] Continuation of Ser. No. 217,544, Jul. 11, 1988, abandoned, which is a continuation-in-part of Ser. No. 141,534, Jan. 7, 1988, abandoned.

[30] Foreign Application Priority Data

| Jul. 9, 1987 | [JP] | Japan | 62-171790 |
| Jul. 9, 1987 | [JP] | Japan | 62-171791 |
| Oct. 9, 1987 | [JP] | Japan | 62-255511 |
| Oct. 19, 1987 | [JP] | Japan | 62-263265 |
| Oct. 20, 1987 | [JP] | Japan | 62-264797 |
| Oct. 22, 1987 | [JP] | Japan | 62-266718 |
| Oct. 22, 1987 | [JP] | Japan | 62-266720 |
| Nov. 2, 1987 | [JP] | Japan | 62-278039 |
| Feb. 9, 1988 | [JP] | Japan | 63-27935 |

[51] Int. Cl.⁵ .................................. G06F 15/62
[52] U.S. Cl. ................................. 395/164
[58] Field of Search ............ 364/518, 521, 200, 900; 382/41; 395/162-164, 118-127

[56] References Cited

U.S. PATENT DOCUMENTS

| 4,364,037 | 12/1987 | Walker | 340/744 |
| 4,459,676 | 7/1984 | Oguchi | 364/521 |
| 4,484,137 | 11/1984 | Brown et al. | 340/703 |
| 4,488,174 | 12/1984 | Mitchell et al. | 358/136 |
| 4,533,952 | 8/1985 | Norman, III | 358/160 |
| 4,574,357 | 3/1986 | Pastor et al. | 364/518 |
| 4,580,242 | 4/1986 | Suzuki et al. | 364/900 |
| 4,591,897 | 5/1987 | Edelson | 358/22 |
| 4,604,614 | 8/1986 | Farr et al. | 340/728 |
| 4,631,691 | 12/1986 | Pica | 364/521 |
| 4,648,045 | 3/1987 | Demetrescu | 364/518 |
| 4,648,049 | 3/1987 | Dines et al. | 364/521 |
| 4,648,050 | 3/1987 | Yamagami | 364/526 |
| 4,649,378 | 3/1987 | Johnson et al. | 340/728 |
| 4,658,247 | 4/1987 | Gharachorloo | 340/747 |
| 4,663,619 | 5/1987 | Staggs et al. | 340/750 |
| 4,665,556 | 5/1987 | Fukushima et al. | 382/41 |
| 4,716,546 | 12/1987 | Beausoleil et al. | 364/900 |
| 4,725,892 | 2/1988 | Suzuki et al. | 358/287 |
| 4,727,497 | 2/1988 | Peters et al. | 364/518 |
| 4,742,474 | 5/1987 | Knierim | 364/521 |
| 4,747,081 | 5/1988 | Heilveil et al. | 365/219 |
| 4,748,442 | 5/1988 | Allaire | 340/750 |
| 4,749,990 | 6/1988 | Birkner | 340/799 |
| 4,768,029 | 8/1988 | Burrows | 340/799 |
| 4,817,175 | 3/1989 | Tenenbaum et al. | 382/41 |
| 4,827,432 | 5/1989 | Kasano | 364/518 |

Primary Examiner—H. A. Herndon
Attorney, Agent, or Firm—Cushman, Darby & Cushman

[57] ABSTRACT

An image processing system has an input portion to which pixel data is inputted, a convolution processing portion processing each set of pixels in a predetermined convolution area so as to output a processed data for every predetermined convolution area. A computational portion calculates a parameter necessary for a image processing according to the processed data from the convolution processing portion. A converting portion includes a selecting means, to which the output of the computational portion is inputted, a high speed memory to which the output of the selecting means is inputted and a light computational portion for performing light computation to which the output of the high speed memory is inputted and the output of which is inputted to the selecting means.

37 Claims, 34 Drawing Sheets

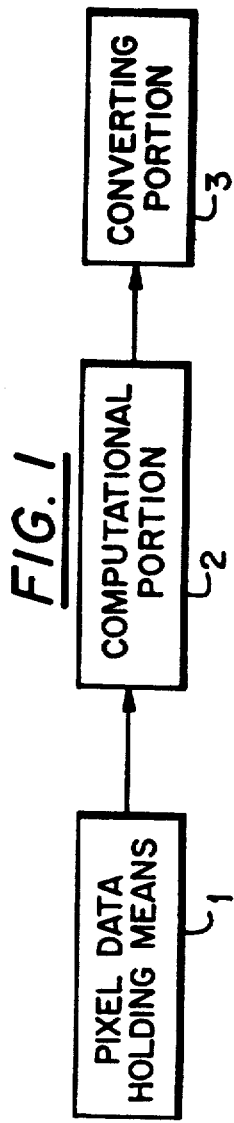
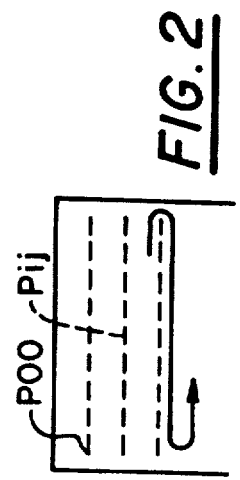
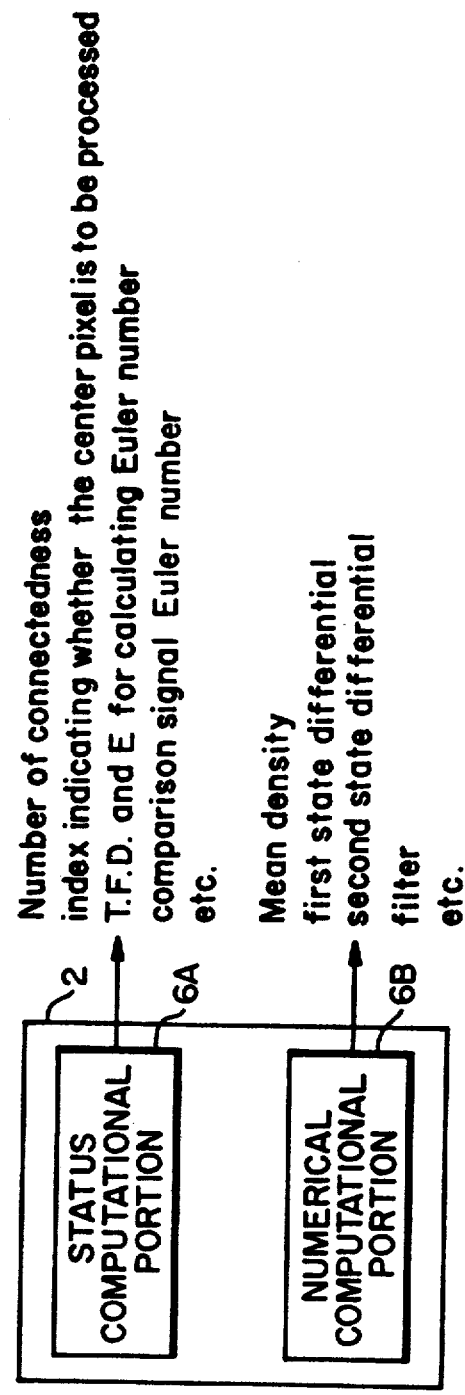

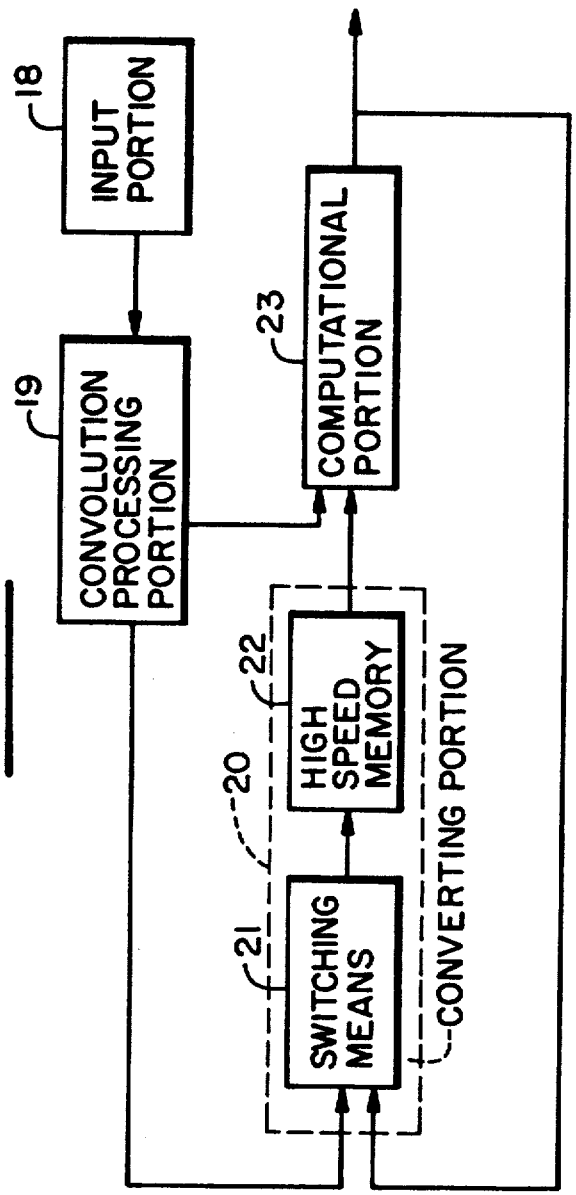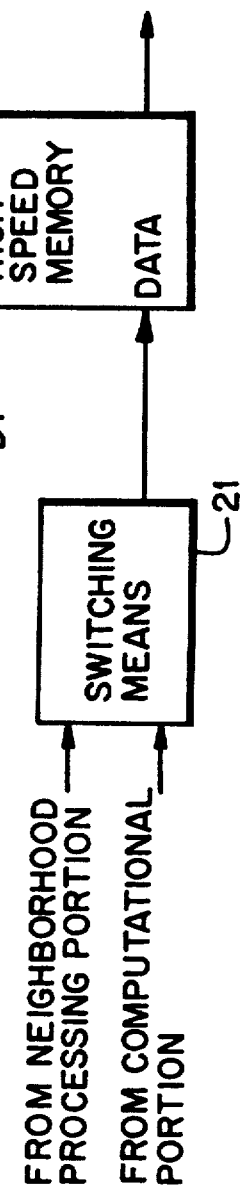

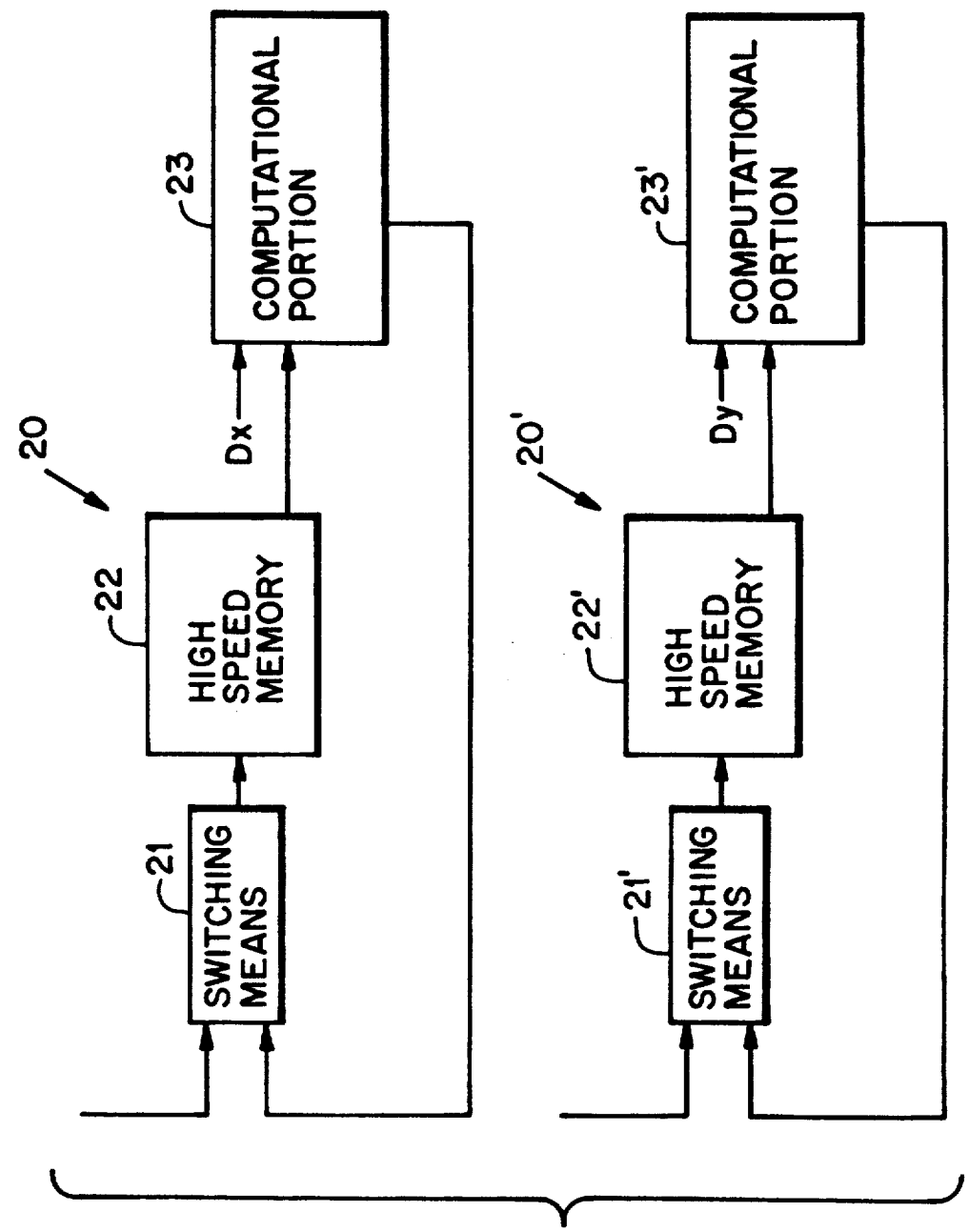

$P00_m 2^{k-1}$ $2^{k-1}$ $(P00_m 2^{k-1} + P2^{k-1}, O_m 2^{k-1})/2$ $2^{k-1}$ $2^{k-1}$ $2^{k-1}$

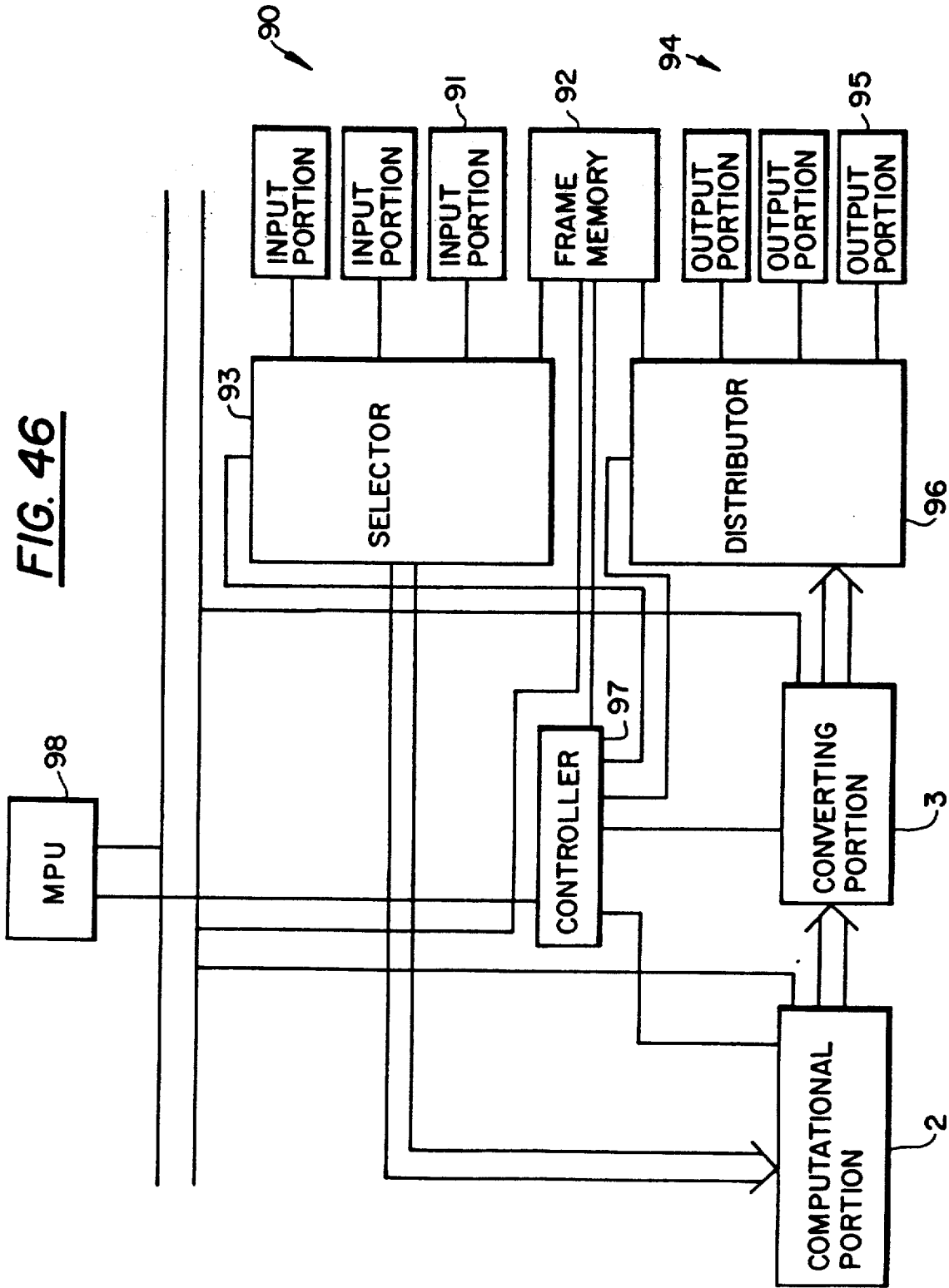

IMAGE PROCESSING SYSTEM

This is a continuation of application Ser. No. 07/217,544, filed on Jul. 11, 1988, which was abandoned upon the filing hereof which is a CIP application of Ser. No. 07/141,534 filed Jan. 7, 1988, now abandoned.

FIELD OF THE INVENTION

The present invention relates to a digital image processing system, and more particularly to such an image processing system which is effective for image processing, image displaying and/or image analyzing in real-time.

BACKGROUND OF THE INVENTION

The term "image processing" has a broad meaning in the art. Image processing includes such operations as clarifying an input picture, recognizing a picture by abstracting characteristics thereof, and computer graphics technology, for example. Image processing also includes special effects technologies such as chroma-keying, which is an image processing method to compose two or more images according to a color in the image. For example, an announcer may stand in front of a blue screen in a studio, and a view of the outdoors is then composed with the image of the studio, within the blue background. This will make it look as though the announcer were standing outdoors. Special effects technologies also include frame composition, frame division and other special effects used in broadcasting systems. Image processing systems include digital types of image processing, analog types of image processing systems, and composite types, which are a composite of the analog and digital types. The digital type image processing system is regarded as the most important because of the high quality of processed data, reappearance, stability in information and the variety of different kinds of processing which can be performed. However, the digital type of image processing system processes an image as an aggregate of a number of pixels. This typically requires an immense number of calculation steps and therefore a long time in order to process a sufficient number of pixels with sufficient graduation, and relationship therebetween, for practical use in such areas as, for example, design use, broadcasting use, etc.

For instance, measurement of a particle-size distribution in a typical picture of 512×512 pixels with a graduation of 8 bits for each of the primary colors of red (R), green (G) and blue (B), has typically required about 20 minutes of calculation time for one frame, using a general purpose personal computer with a calculation processor. Even when using a supercomputer of 20 MIPs, this calculation still takes several seconds of processing time. This has prevented the prior art image processor from being used in real-time.

In order to solve such a problem of a long calculation period, special-purpose integrated circuits (ICs) have been proposed. For instance, a cathode ray tube controller (CRTC) has been proposed for affine transformation or for displaying of a picture, and a specialized integrated circuit for image analyzing of a predetermined number of pixels have been proposed. Unfortunately, these special purpose ICs are only applicable to narrow and specialized types of image processing. A system including such special purpose ICs therefore has a low cost-performance because of its narrowly restricted application. Since such ICs are designed without considering the cooperation with other ICs, particularly ICs made by other companies, it has been substantially impossible to construct a multi-purpose image processing system by using a plurality of such ICs.

Some special-purpose hardware systems have been designed for special manufacturing lines. Such systems are, however, usually useful for only one purpose and restricted in their operating conditions. When the particular condition is not that which was intended, a frequent measurement error may occur, or measurement may become impossible. Newly improved image processing algorithms cannot be introduced into such systems due to their lack of flexibility.

For improving the process speed of image processing hardware or IC, a pipe-line architecture is usually applied.

However, a processing speed of a portion in the hardware is sometimes not enough for achieving the highest pipe-line process speed during a critical process condition.

SUMMARY OF THE INVENTION

The present invention is provided to overcome these drawbacks of the prior art. This image processing system includes convolution processing steps to obtain a group of pixel data, a preparation step applicable to various processing techniques, and a converting step to obtain the final processed image or characteristic value according to the result of the preparation. According to the present invention, the preparation of numerical computations and status computations takes place in a computational portion. Operations such as referring to a table, multiplication, integration of the result of a light calculation and a temporal accumulation of intermittent information take place in a converting portion.

The computational portion comprises a numerical computational portion and a status computational portion. The numerical computational portion determines, for example, the graduation, density and/or RGB level of pixels as an parameter to be used. This enables a determination, for example, of mean density. The status computational portion evaluates each pixel so that, for example, a determination of whether the pixel is to be processed or not is made. This determination is indicated as one bit of information and the neighborhood information is generated.

The converting portion comprises a high speed memory with a feedback line from the output thereof to an input thereof and a light computational portion provided on the above feedback line. An output of the high speed memory is occasionally introduced through the light computational portion to the input of the high speed memory. By changing the processing performed by the light computational portion, various kinds of conversions can be performed, even though no heavy computations are made. Therefore, a very high speed conversion is realized due to the light computational load.

The numerical computational portion comprises a multiplication portion for multiplying each pixel data by a multiplier, a selector for distributing or introducing the output of the multiplication portion to proper outputs, and an integration portion for integrating the output of the selector to obtain a calculation result. The numerical computational portion is based on image processing operations, such as addition or multiplication by a space factor, or a space filter having characteristics of isotropy and symmetry. According to this concept, the output of the multiplication portion is distributed by a selector so that the number of multiplication modules in the multiplication portion, in which a large number of logical gates are needed, is minimized. This optimizes the gate efficiency and allows high flexibility and a wide field of application.

Therefore, the object of the present invention is to provide an image processing system with a wide field of application, and which processes at higher speed than a general-purpose super computer, and which is higher in cost performance.

BRIEF DESCRIPTION OF THE DRAWINGS

An exemplary and presently preferred embodiment of the invention will be described in detail with reference to the accompanying drawings, wherein:

FIG. 1 shows a block diagram of the first embodiment of an image processing system according to the present invention;

FIG. 2 shows the pixel aligned and included in a displayed picture;

FIG. 3 shows a $3 \times 3$ convolution group of pixels in a picture;

FIG. 5 shows a block diagram of an embodiment of the computational portion;

FIG. 13 shows block diagram of the second embodiment of the image processing system;

FIG. 14 shows an example of the converting portion of the image processing system in FIG. 13;

FIG. 15 shows the first embodiment of the converting portion of FIG. 14;

FIG. 40 (B) shows the result of the image after calculating the average value of the images in FIG. 40(A) and FIG. 40(B);

FIG. 40 (C) shows the concept of the image after scrolled to the column direction by the same direction of $2^{k-1}$ pixels in FIG. 40(B);

FIG. 46 shows a block diagram of another embodiment of the whole structure of the image processing system.

DETAILED DESCRIPTION OF THE PREFERRED EMBODIMENT

Exemplary preferred embodiments of the image processing system according to the present invention will be described in detail hereinafter.

In FIG. 1, an image processing system has pixel data holding means 1 for receiving pixel data. The pixel data is sequentially processed through the pixel data holding means 1, computational portion 2 and converting portion 3.

FIG. 2 shows pixel data Pij, generally arrayed sequentially every one raster. Pixel data holding means 1 is of a size to hold each raster and can pick up the data of any predetermined size area.

As shown in FIG. 3, the size of the area is generally $3 \times 3$, but can alternately be any larger or smaller size.

Figure 4:
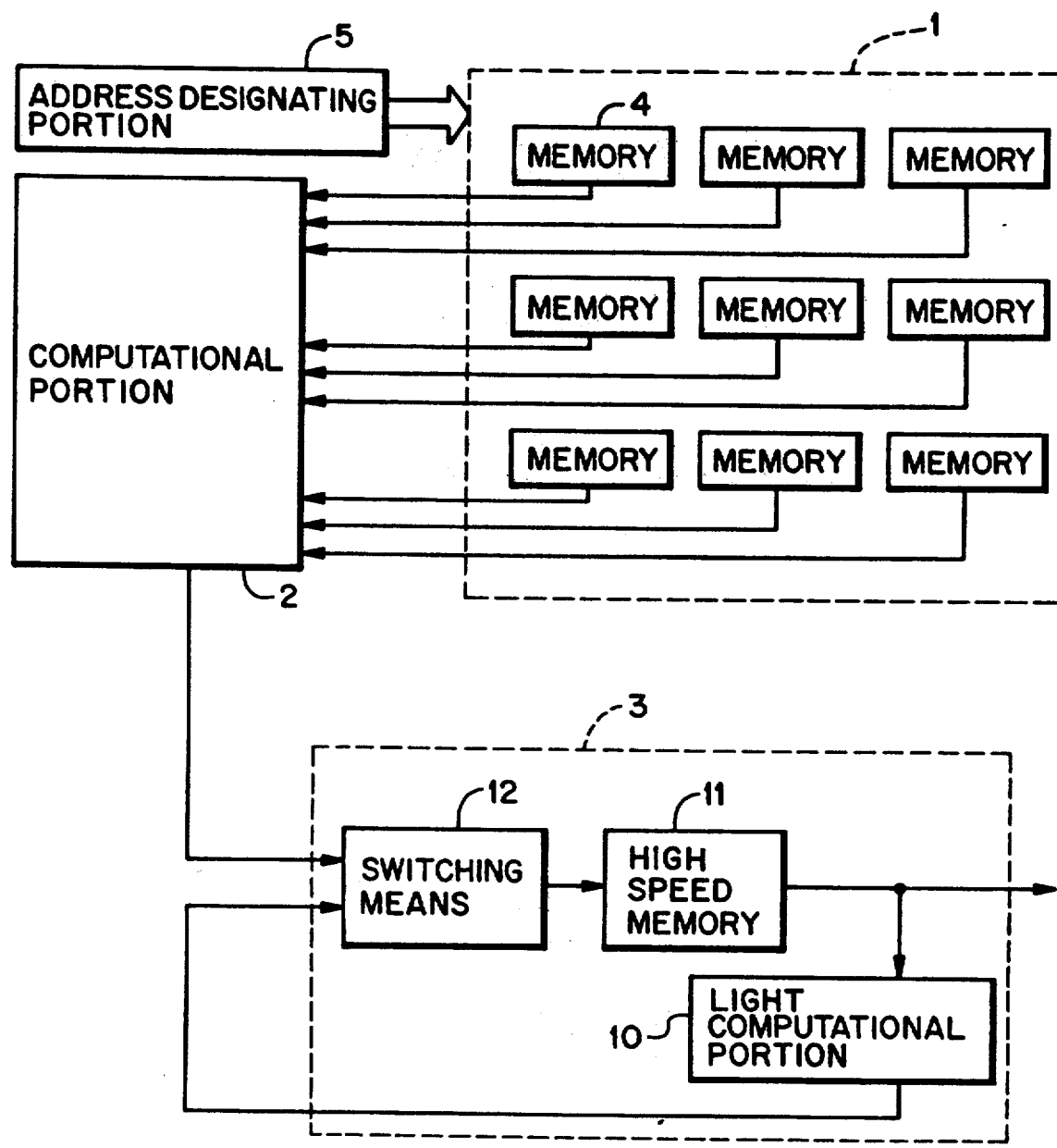
FIG. 4 shows a block diagram of an embodiment of the image processing system.
Figure 4B:
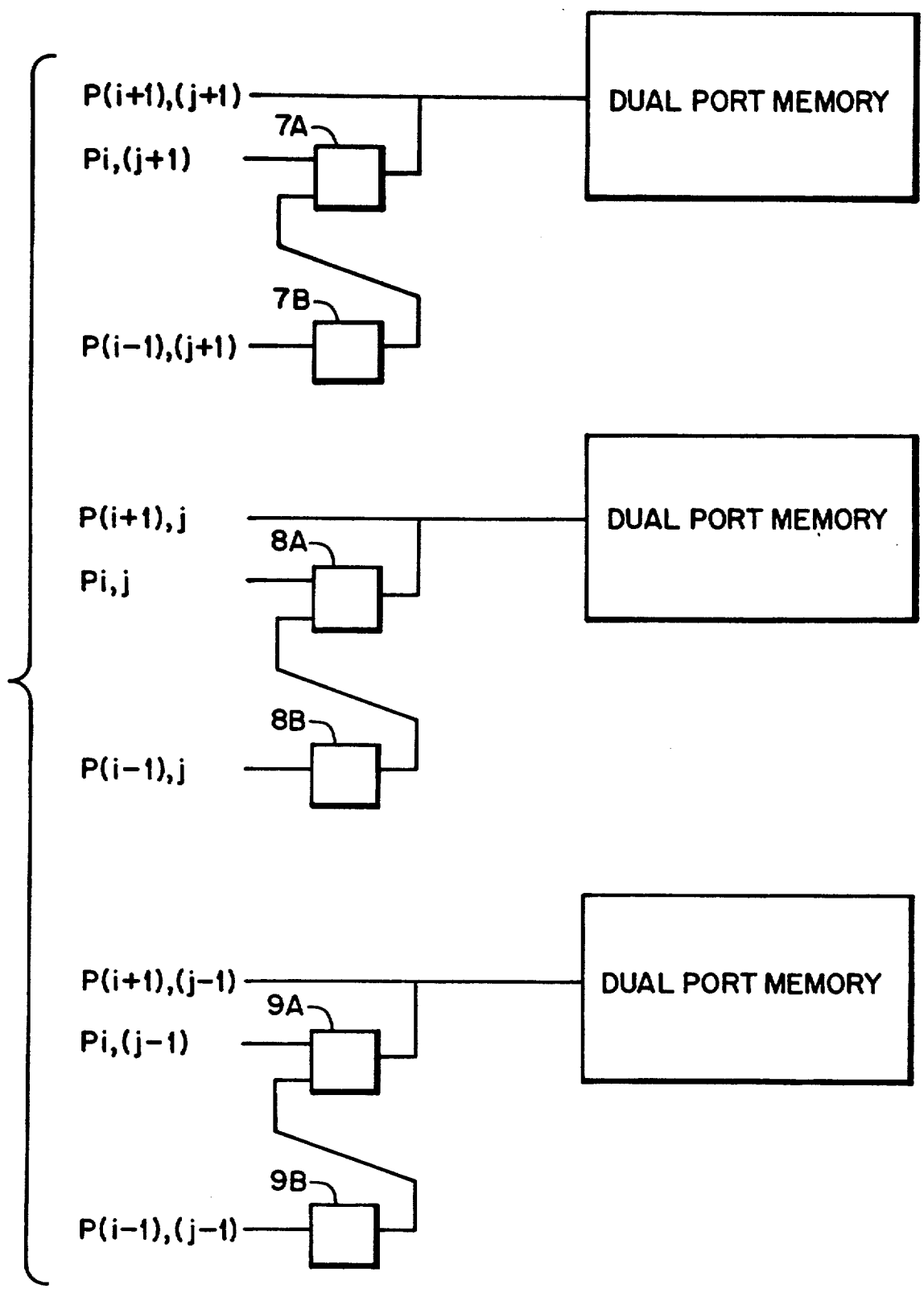
FIG. 4B shows a block diagram of the delay portion.

FIG. 4 shows a first embodiment of an image processing system according to the present invention. The pixel data holding means 1 comprises a plurality of memories 4 and an address designating portion 5. Nine of the memories 4, one corresponding to each pixel of the 3×3 area in FIG. 3, are provided. All of the pixel data for each one frame are stored in the associated memory for that frame. Address designating portion 5 designates each one pixel in the area of FIG. 3 in each memory. Each designated pixel can then be simultaneously sent to the computational portion 2. One data in each address may be of sufficient capacity of, for example, three pixel data. This enables a sequential three pixel data to be read out by a single address designation. Each pixel data needed is obtained by extracting predetermined bits from the data then transmitted to computational portion 2. When one address data has more bits than needed (three bits in FIG. 3), only the necessary bits are picked out, after reading out the data in the address. When a dual port memory which can hold 512×512 pixels is used as the frame memory, each memory may correspond to one raster, so that the data of the sequential three rasters are read out simultaneously and only the necessary bits are picked out. In this case a delay portion will be necessary for delaying two pixels for each dual port memory. An example of a suitable delay device is shown in FIG. 4B. FIG. 4B includes latches 7A, 7B, 8A, 8B, 9A, 9B for the delaying.

As shown in FIG. 5, computational portion 2 comprises at least status computational portion 6A and numerical computational portion 6B. Status computational portion 6A can be used to compute a number of connectedness, an index indicating whether the pixel is to be processed, parameters T, F, D and E to calculate the Euler number, a comparison signal to indicate the status of the pixel to be processed and a convolution condition, among other parameters. Numerical computational portion 6B can calculate, mean density, first state differential, second state differential, filter processing, etc. These process of computational portion 6A and 6B can be processed at a high speed using pipeline processing.

Figure 6:
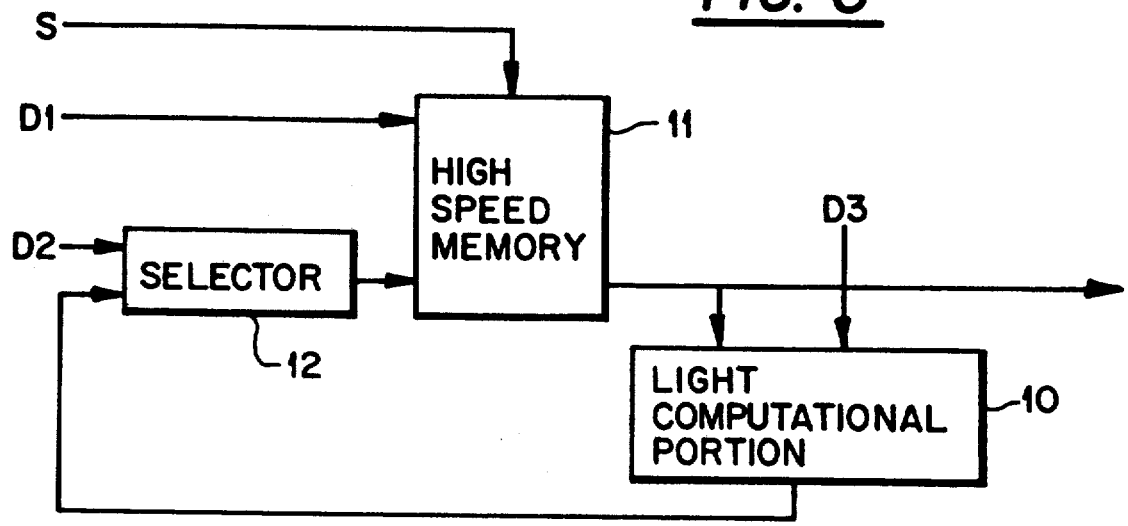
FIG. 6 shows a general block diagram of the converting portion.

Converting portion 3 is constructed as shown in FIGS. 4 and 6. A light computational portion 10 is connected to a branch of an output of a high speed memory 11 for executing light computations. The output of the light computational portion 10 is fed back to an input side of high speed memory 11. A selector (switching means) 12 is connected to the input of high speed memory 11, and the output of light computational portion is inputted to one input of the selector 12. Data D1 is inputted to an address input of high speed memory 11, and the output of selector 12 is connected to the data input of high speed memory 11. The output of light computational portion 10 and data D2 are inputted in parallel to the two inputs of selector 12, which selectively routes one of them to the output, to select the outputs of light computational portion or data D2 to high speed memory 11. As for high speed memory 12, a high speed static RAM or the like is suitable. By feeding back the data through light computational portion 10 to the input side of high speed memory 11, it becomes possible to perform the same computational process of one data repeatedly, or to store consecutive data processed in the same process manner from a group of data. It is also possible to perform the same computational process of one data repeatedly or to store consecutive data processed in the same process manner from a group of data. It is also possible to perform quite many kinds of processes, such as multiplication of data, subtraction of data, sequential comparison of data and so on. Of course, it is also possible to use the high speed memory 11 as a table to read out the data stored in the address designated.

Figure 7:
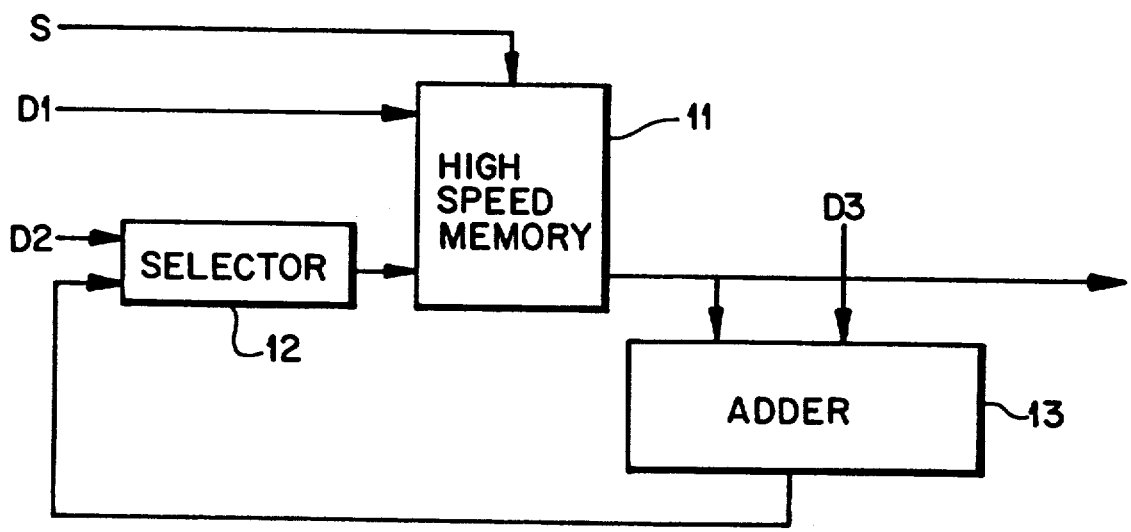
FIG. 7 shows a block diagram of the first embodiment of the converting portion.

FIG. 7 shows the converting portion including an adder 13 as the light computational portion: the output of high speed memory 11 as well as data D3 is inputted to inputs of adder 13. The high speed memory 11 receives a signal S for chip select, or WE for write enable.

For example, when the area of the binary image or labeled image is calculated, a pixel value is inputted as an address D1 to high speed memory 11 and data stored in the address in outputted from high speed memory 11. After that, the outputted data is added with data D3 (which would be "1" in this case) in adder 13. The result of the addition is fed back to selector 12 and is stored again in the address D1 of high speed memory 11. By performing this process, the number of pixels in a image can be counted, and the area of each labeled region can be calculated.

Figure 8:
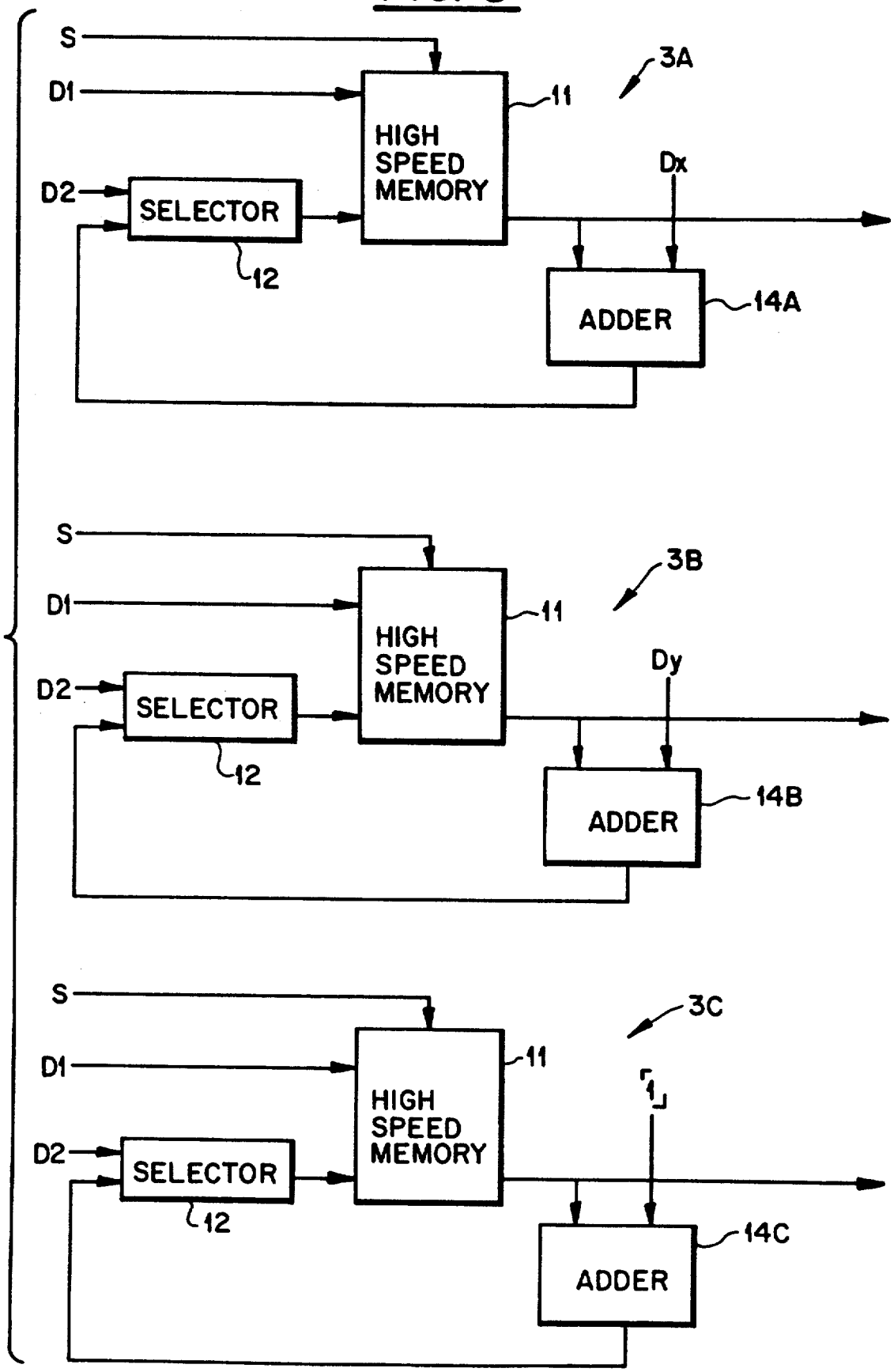
FIG. 8 shows a block diagram of the second embodiment of the converting portion.

FIG. 8 shows a converting portion to find the center of gravity of a FIGURE. Three converting portion 3A, 3B and 3C, each the same as in FIG. 7, are connected in parallel. Dx, the value of the x coordinates, Dy, the value of the y coordinates, and "1" is inputted to the adders 14A, 14B and 14C, respectively. Converting portion 3C, which receives a "1", is a circuit to calculate an area in the same way as in FIG. 7. Converting portions 4A and 4B are circuits for integrating the coordinates X and Y and for writing integrated data in the high speed memory using the signal S when the pixel data is "1". The value of integrated coordinate X divided by the area is the Y coordinate of the center of the gravity. This allows an operation in a CPU, to avoid special purpose hardware being used to perform this operation. Considering the portability and wide usage of the system, such complex operation is most advantageously done in the CPU.

As for the labeled image, the pixel value or density is inputted as the address data D1 of the high speed memory and the coordinate of Dx, Dy of each pixel are integrated and stored in the address designated by D1. This allows the center of the gravity of a plurality of labeled areas to be calculated simultaneously.

Figure 9:
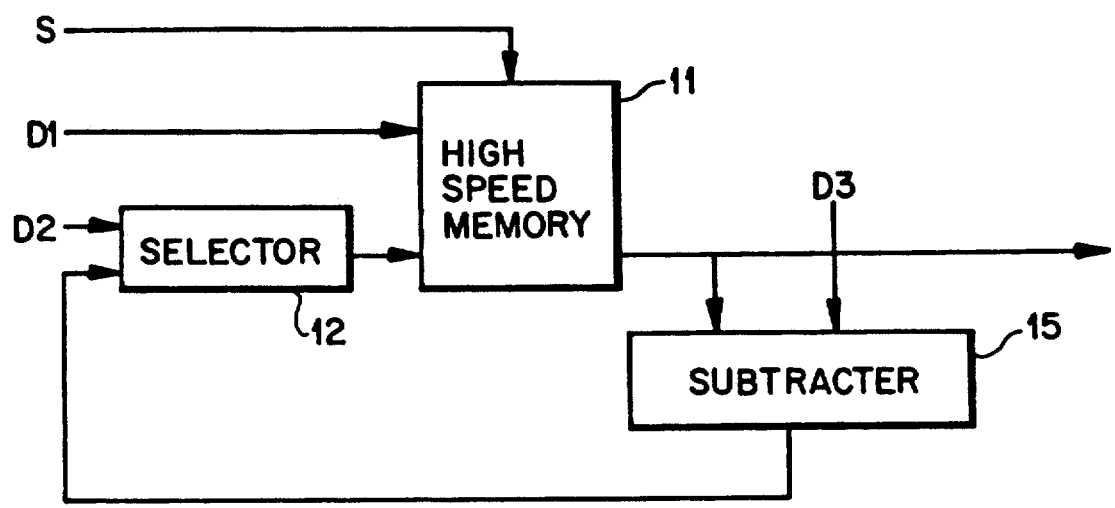
FIG. 9 shows a block diagram of the third embodiment of the converting portion.

FIG. 9 shows a converting portion with subtracter 15 as the light computational portion. The output of high speed memory 11 and Data D3 are inputted to the subtracter 15, and the signal S of CS (chip select) or WE (write enable) are inputted to the high speed memory. The subtracter 15 can be replaced by an adder to calculate complements, and are substantially equal to the circuits in FIG. 7 and FIG. 8. The use of a subtracter allows, for example, smoothing the histogram including operation of distributing pixels of the same density; that is, for increasing the number of pixels of a density with a decreasing gradually number of pixels of other density as well as many other kinds of values to be subtracted gradually.

Figure 10:
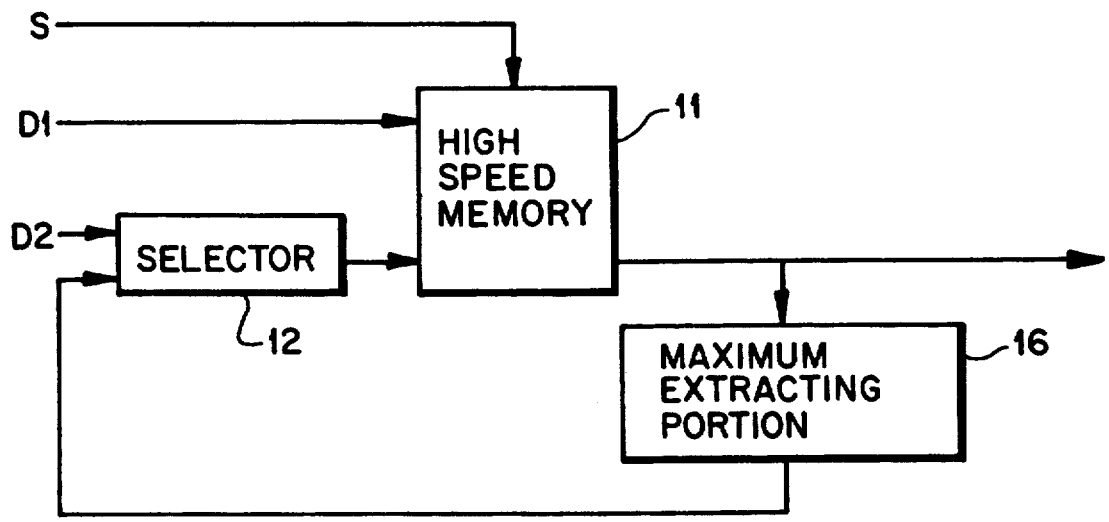
FIG. 10 shows a block diagram of the fourth embodiment of the converting portion.
Figure 11:
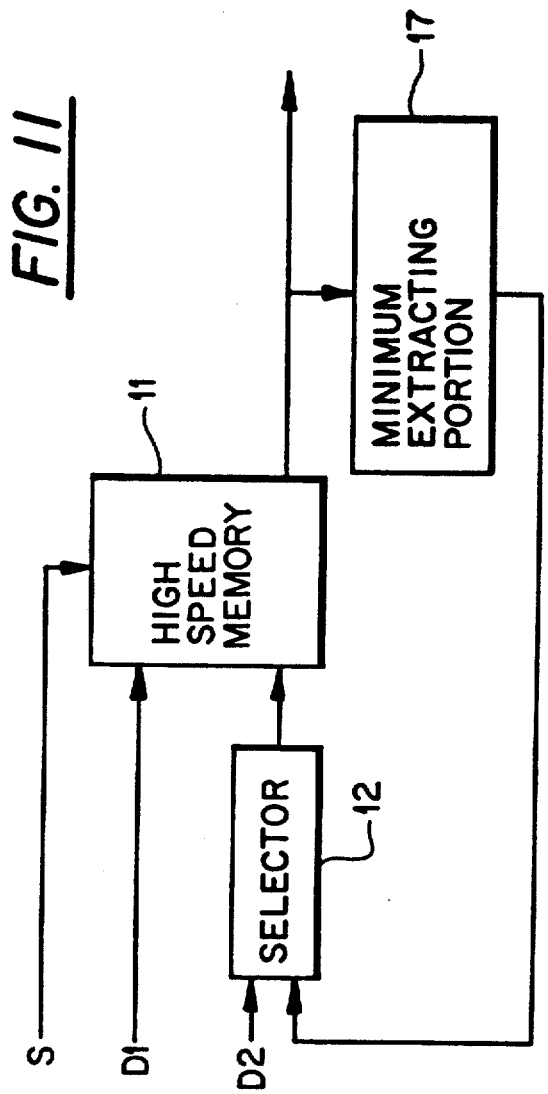
FIG. 11 shows a block diagram of the fifth embodiment of the converting portion.
Figure 12:
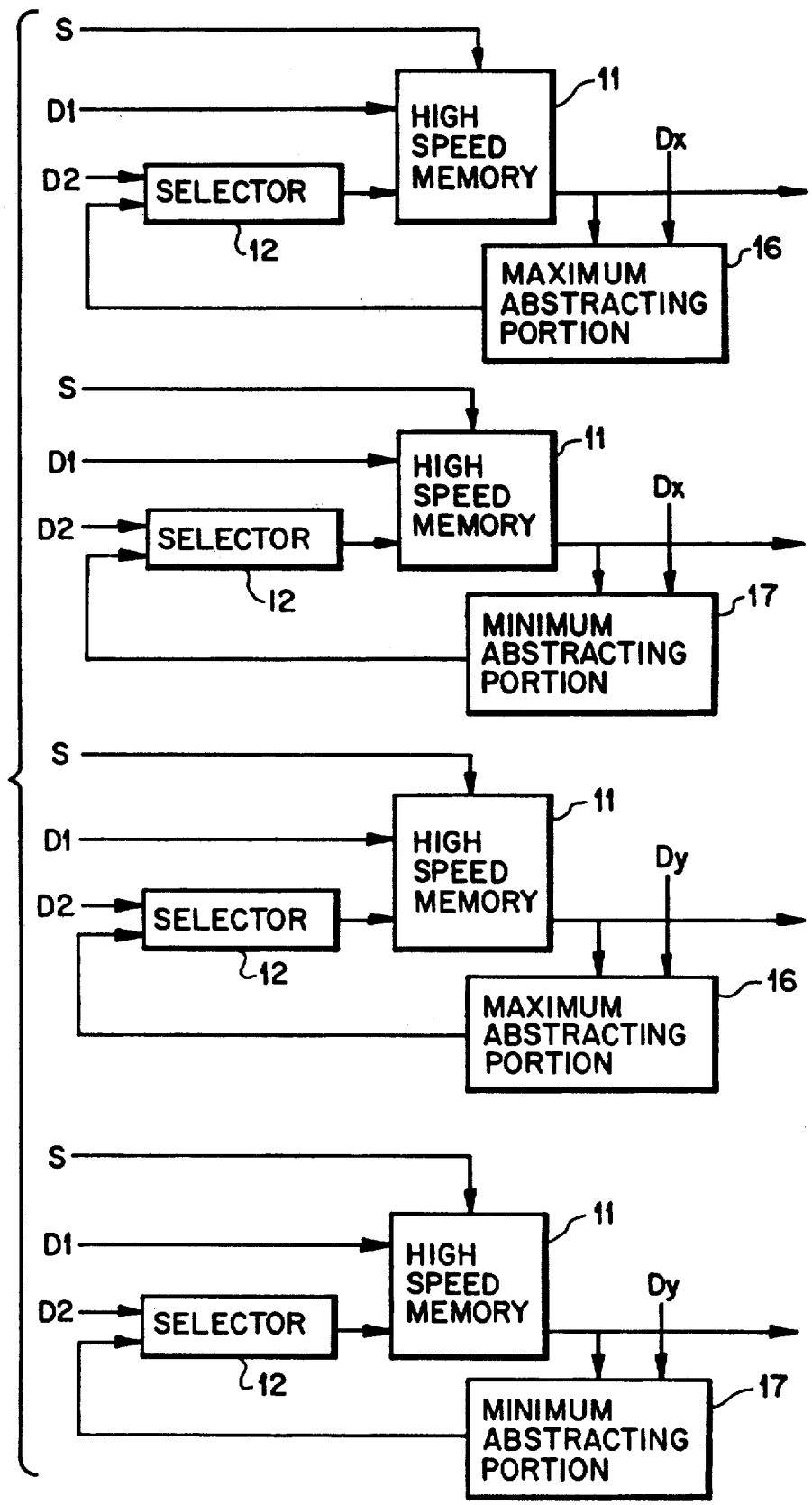
FIG. 12 shows a block diagram of the sixth embodiment of the converting portion.

FIG. 10 shows the converting portion with a maximum extracting portion 16 as a light computational portion. FIG. 11 shows the converting portion with a minimum extracting portion 17. Maximum extracting portion 16 compares the data stored in the high speed memory 11 with the newly introduced data and feeds the larger data back to high speed memory 11. On the contrary, minimum extracting portion 17 feeds smaller data back to the high speed memory 11. These converting portions have extremely wide usage. Fillet diameter processing can be easily performed as a simple task in the MPU after extraction of the maximum and minimum of Dx and x coordinates, Dy of Y coordinates of a FIGURE, as shown in FIG. 12.

FIG. 13 shows the image processing system with an input portion 18 for receiving pixel data. The pixel data is sequentially processed through input portion 18, convolution processing portion 19 and converting portion 20. As shown in FIG. 3, pixel data Pij is generally arrayed sequentially on every raster in the convolution processing portion 19, similar to the circuit in FIG. 4B.

The data outputted from convolution processing portion 19 is inputted to the converting portion 20. The converting portion 20 comprises switching means 21 connected to th convolution processing portion 19; and high speed memory 22 connected to the output of the switching means 21. The output of high speed memory 22 is connected to the computational portion 23. A branch of an output of computational portion 23 is fed back to the input ide of the switching means 21, so the result of computation is inputted to the high speed memory 22.

FIG. 14 shows another variation of converting portion 3. In this variation, the output of switching means 21 is inputted to the data input of high speed memory 22. Data D1 is inputted to the address input of the high speed memory 22, and a signal S is inputted to the terminals of CS (chip select), WE (write enable). A high speed static RAM can be used as the high speed memory 22. By feeding the data through the computational portion 23 back to the input side of high speed memory 22, it becomes possible to perform the same computational process repeatedly to a data or store a group of data sequentially in the high speed memory 22 after performing the same process. It is also possible to perform many other kinds of processes, for example, multiplication, or sequential comparison of a series of data. It is, of course, possible to use the converting portion as a table that is, giving data D1 as the address to the high speed memory 22 and reading out the data stored in the address.

When the computational portion 23 is used as an adder, it is easy to calculate an area by inputting data "1" besides the output of a high speed memory.

For a binary image or a labelled image, the pixel value is inputted to the high speed memory 22 as address D1, the stored data in the address in high speed memory 11 is outputted, and the value of the outputted data added with data "1" in the computational portion 4 is fed through the switching means 21 back to the high speed memory and again stored in the address D1. The number of pixels of each pixel value in an image is counted and the area of each labeled region is calculated.

FIG. 15 is a circuit to calculate the center of gravity. Two converting portions 20 and 20' and the computational portions 23 and 23' are used. Dx of the x coordinates of each pixel is inputted to the computational portion 23, and Dy of y coordinates of each pixel is inputted to the other computational portion 23'. Initially Dx and Dy are once stored by their respective high speed memory 22-22'. The stored Dx, Dy are outputted from high speed memory 22-22' and added with next Dx, Dy in the computational portion 23-23' when the next data are inputted to the respective computational portion 23. Dx, Dy are then integrated and the first state moment is obtained. When the circuit to calculate an area like FIG. 14 is introduced, the coordinates of the center of gravity can be easily obtained by dividing the linear moment by the area.

A labeled image similar to the above can be processed by indicating the address D1 by the value of pixel data when new Dx, Dy are inputted to the computational portion. The integrated Dx, Dy are added to a new, Dx, Dy and stored again in the address. Then, the center of the gravity of a plurality of the labeled area are simultaneously obtained.

Figure 16:
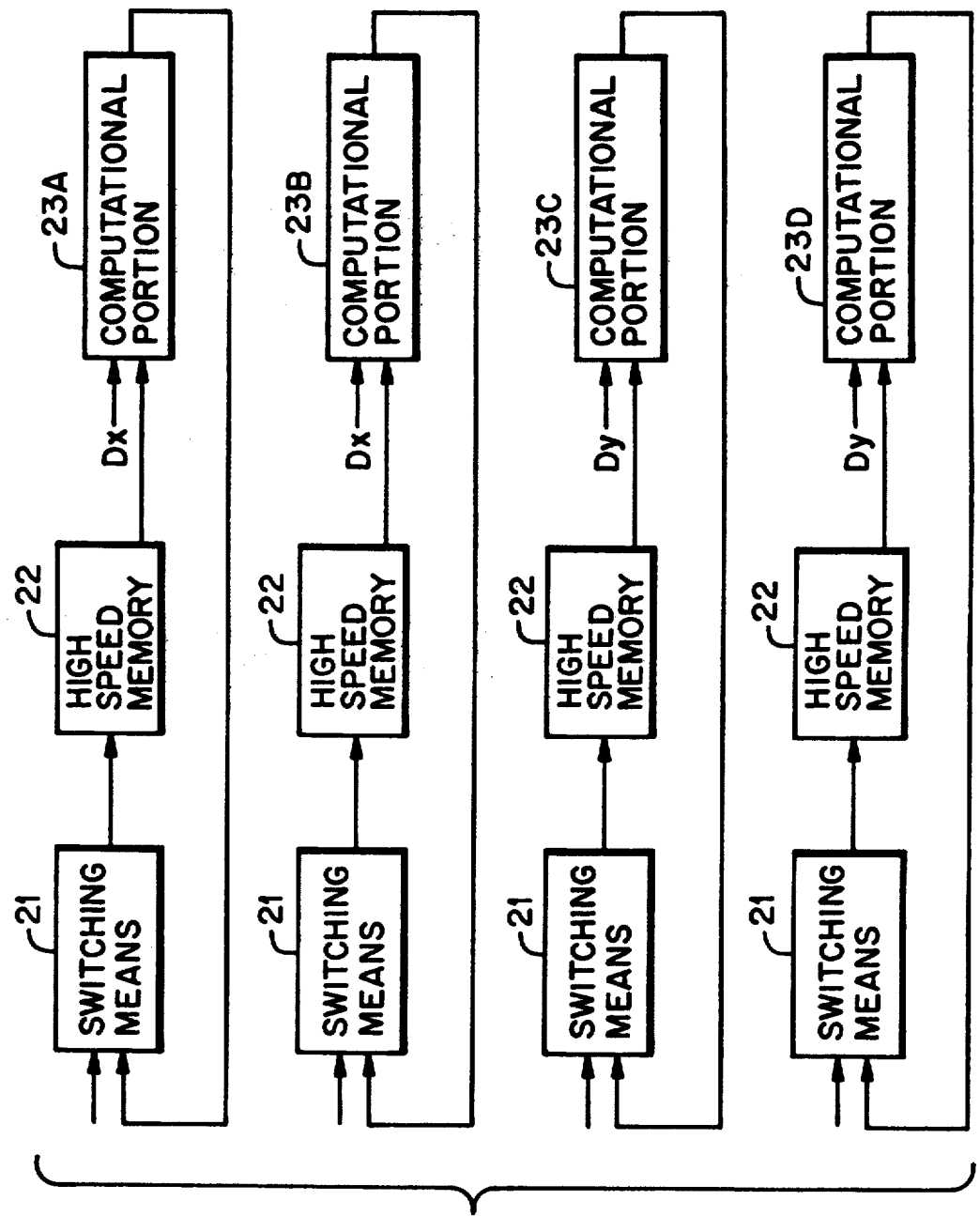
FIG. 16 shows the second embodiment of the converting portion.

FIG. 16 shows a computational portion used to extract a maximum or a minimum. The computational portions for extracting maxima are 23A and 23C, and the computational portions for extracting minima are 23B and 23D. Dx of the x coordinates are inputted to the computational portions 23A and 23B; Dy of the y coordinates are inputted to the computational portions 23C and 23D. The maximum extracting portion compares the data Dx and Dy stored in the high speed memory with the current data Dx and Dy and stores the larger in the respective memory. Minimum extracting portion substitutes the smaller and stores the larger in the respective memory. Finally, the maximum and minimum of Dx and the maximum and minimum of Dy is left in the high speed memory 22. A fillet diameter can be easily calculated by using the above circuit.

Computational portions 23A, 23B, 23C or 23D are provided with data from the high speed memory 22 or from convolution processing portion 19: the data given is pixel data of a certain convolution area in FIG. 3, or can be a pair of pixel data.

Figures 17, 18, 19:
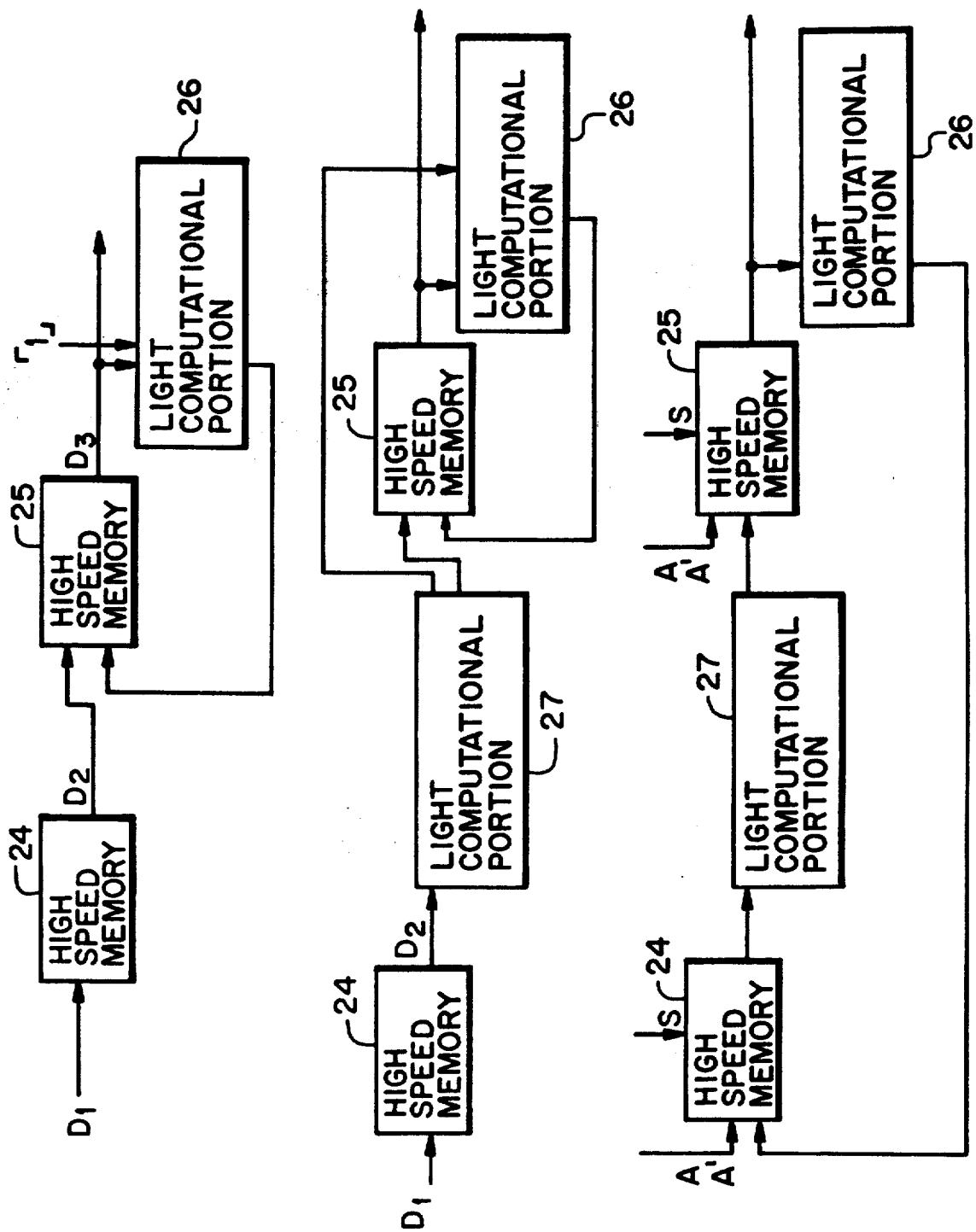
FIG. 17 shows a block diagram of the first embodiment of another type of converting portion.
FIG. 18 shows a block diagram of the second embodiment of the converting portion.
FIG. 19 shows a block diagram of the third embodiment of the converting portion.

In FIG. 17, the converting circuit comprises first and second high speed memories 24 and 25, the input of the second high speed memory being connected to the output of the first high speed memory. The first high speed memory 24 is used as a table. Data D1 is inputted to the address input of the first high speed memory 24; the high speed memory 24 outputs the data stored to the address designated by the data D1. Many kinds of data can be stored in the high speed memory 24. For example, color code, the result of a power operation, the result of an operation of trigonometric function, or the result of a logarithm operation can be stored, to name a few. The second high speed memory 25 integrates or executes other operations of these converted data. The light computational portion 26 is connected to a branch of the output of the second high speed memory 25. The high speed memory 25 outputs the integrated value D3 of data D2 when the output data D2 of the high speed memory 24 is inputted to the address input of the high speed memory 25. A constant "1" is added to this integrated value D3 in the light computational portion 26, and is stored again in address D2 of the high speed memory 25. The multiplication value of each D2 can be sequentially renewed in this way, to provide:

$$\Sigma D_1^2$$

to be stored in the high speed memory 25.

FIG. 18 shows a second embodiment where the data D1 is the pattern number of a certain convolution in the image. Characteristic values are stored in the high speed memory 24 corresponding to the pattern number. When a number indicative of T, F, D and E of the known Euler number are stored as characteristic values in a form of a series of bits, and a data D1 is inputted as an address to the high speed memory, data D2 including the whole parameters of T, F, D and E is output. A light computational portion 27, which separates the number of T, F, D and E from the series of bits, is connected between the high speed memories 24 and 25 above. The light computational portion 27 once holds the data D2, and after that, sequentially inputs the number of T, F, D and E to the light computational portion 26 as well as then inputs the addressed corresponding to T, F, D and E to the high speed memory 25, at the same time. The current integrated value of the number of T, F, D and E are stored in a high speed memory 25; and when the addressed corresponding to T, F, D and E are inputted, each value of integrated T, F, D and E is outputted from high speed memory 25, and are added to new numbers of T, F, D and E in the light computational portion 26. The result of addition is fed again back to the input side of the high speed memory 25 and inputted to each address of T, F, D and E. The value of integration of T, F, D and E can be obtained by repeating this operation.

FIG. 19 shows a third embodiment in which the light computational portion 27 is connected to the output of the high speed memory 24 and the output of the light computational 27 is connected to the input of the high speed memory 25. The light computational portion 26 is connected to the branch of the output of the high speed memory 25, and the output of the light computational portion 26 is connected to the input of high speed memory 24. The high speed memories 24 and 25 are alternately set in read-out mode and in writing mode by signal S. When one is in the read-out mode the other is in the writing mode. The same address A is designated in the memories 24 and 25; the data read out from one of them is immediately written into the other at a corresponding address after operation by the light computational portion 26 or 27. For example, when integrating the characteristics value or the value of labeling, the outputs of memories 1 and 2 are increased (added by "1") in both light computational portions 26 and 27. When the current values of integration is stored in the high speed memory 24 and a data (corresponding to address A) is inputted, the high speed memory 24 is set to be read out mode, the high speed memory 25 is set to the writing mode, and the address A is designated for both memories 24 and 25. Then, the value of integration stored in the address A of high speed memory 24 is increased in the light computational portion 27, and written in the address A of the high speed memory 25. When the next data (for example of address A') is inputted, the data in the high speed memory 25 is written into the high speed memory 24 after being increased in the light computational portion 26 by setting memories 24 and 25 to be in the writing and reading mode, respectively. Therefore, the final integration values can be found in the memory finally written concerning as many kinds of data as the total number of addresses in memories 24 and 25. Moreover, this performance occurs at high speed because the read/write mode is changed at the same time and the light computational portion operates in high speed due to its "light" calculation load. The operation of Min or Max can be introduced as the operation of the light computational portion; the maximum or minimum of the value of the coordinates x and y can be extracted; for example, inputting new x coordinate and y coordinate in the light computational portion, and selecting the bigger between the current maximum coordinate data in the new coordinate data.

Figure 20:
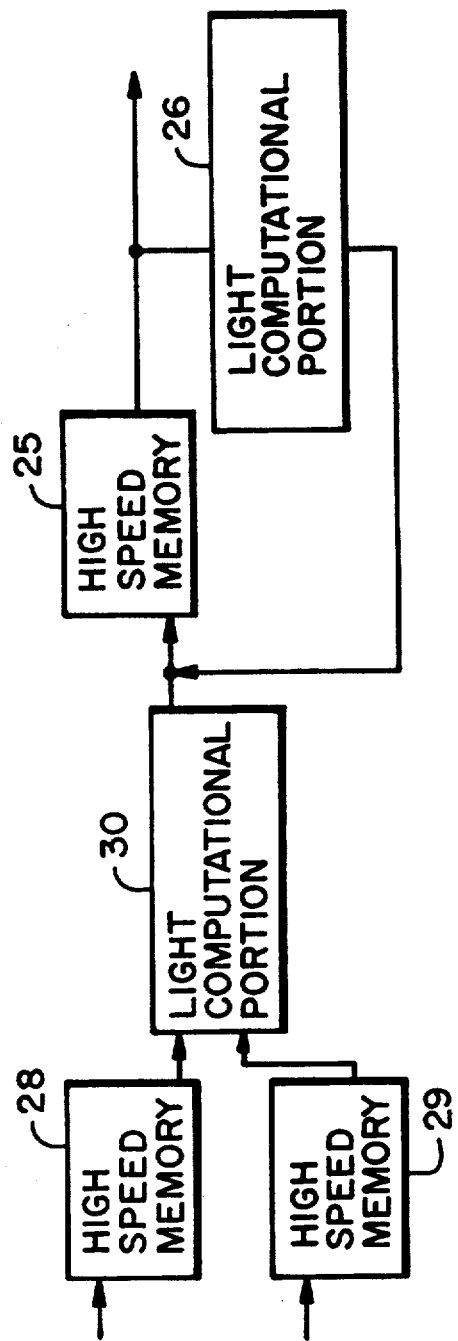
FIG. 20 shows a block diagram of the fourth embodiment of the converting portion.

FIG. 20 shows the fourth embodiment; the light computational portion 3 is connected to outputs of two high speed memories 28 and 29, and the output thereof is inputted to the high speed memory 25. The light computational portion 26 is connected to the high speed memory 25 in a way similar to the construction of the latter portion of FIG. 17. The light computational portion 30 operates EX-OR gates, and the high speed memories 28 and 29 output the pixel information such as color code corresponding to the input signal. When the outputted information from memories 28 and 29 coincide with each other, the light computational portion 30 outputs a "0" data, and otherwise "1", to the high speed memory 25, and the high speed memory 25 outputs the current number of pixel matching so that the number is increased in the light computational portion 26 and then stored in the memory 25 again. The number of pixel matching, or the same density area of two images, can be counted in this way.

When the converting circuit should perform pipeline-wise, even when a data in one address in high speed memory is repeatedly operated by light computation during the read cycle and to write the result of light computation to the high speed memory during the next write cycle. However, a case exists in which not enough time for operation is given to the light computational portion when the pipe-line cycle is maximized up to its highest level of read/write cycle speed of high speed memory.

The embodiment hereinafter includes a converting portion including a high speed memory, selecting means connected to the data input of the high speed memory and a light computational portion connected to a branch of the output of the high speed memory. The output of the light computational portion is input to the selecting means. A selector is connected between the branch of the output of the high speed memory and the light computational portion, and a branch of the output of the light computational portion is fed back to the input of the selector. A high speed calculation is repeatedly executed on the loop from the feed back line through the selector to the light computational portion. Due to this construction, data in one address of the high speed memory is calculated in the light computational portion and returned to the same address in one read/write cycle even when the high speed memory is driven as fast as possible.

Figure 21:
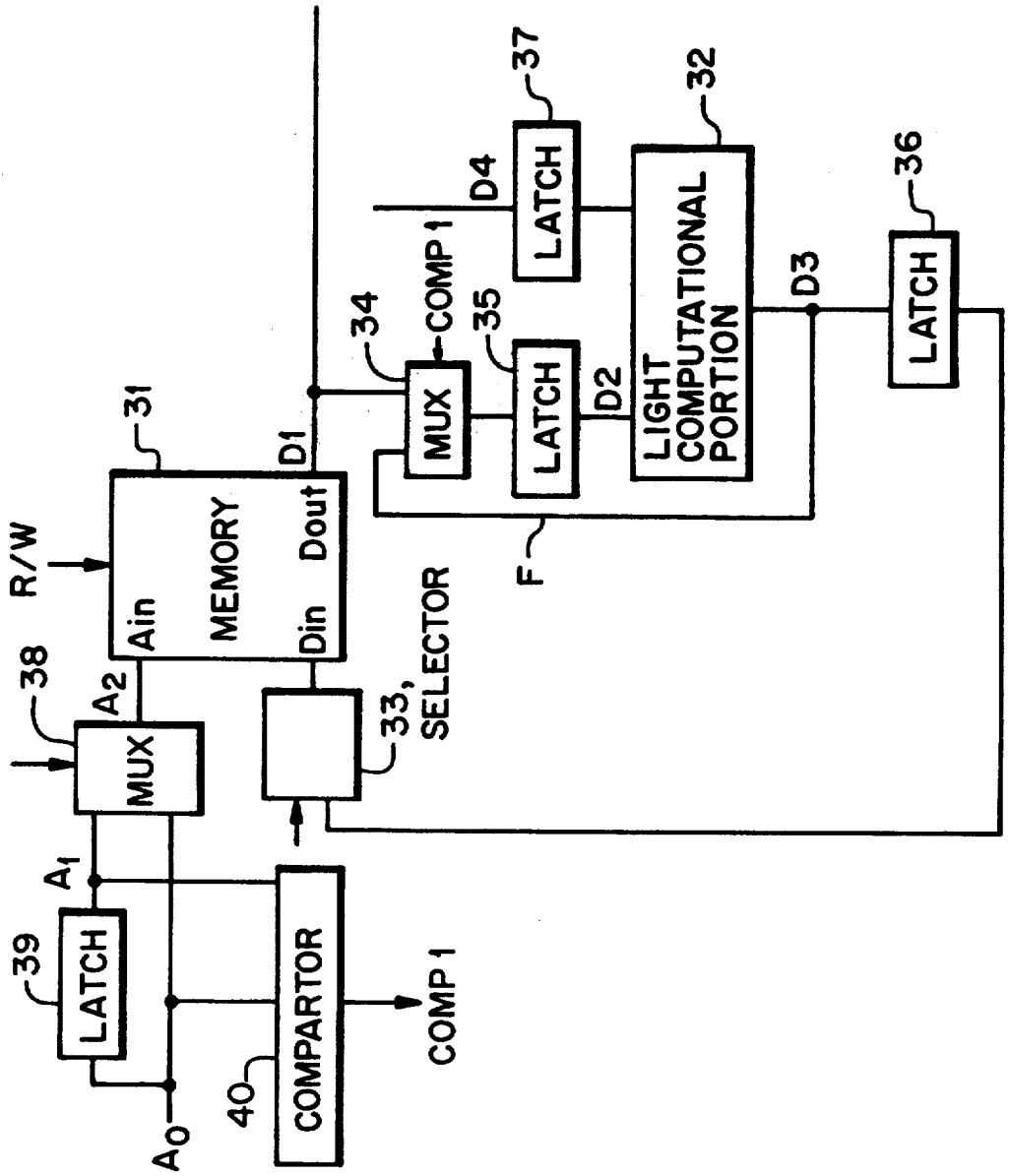
FIG. 21 shows a detailed block diagram of an embodiment of the converting circuit.

In FIG. 21, the converting portion comprises a high speed memory 31, consisting of static RAM, or the like, a light computational portion 32 connected to a branch of the data output of the high speed memory 31, and a selector 33 connected to the data input of the high speed memory 31. The output of the light computational portion 32 is connected to the input of the selector 33.

A multiplexer 34 and a latch 35 are connected in series between the output of the high speed memory 31 and the light computational portion 32. Data output from the high speed memory 31 is input through the multiplexer 34 and the latch 35 to the light computational portion 32 and the selector 33. The output of the light computational portion 32 is input through the latch 36 to the selector 33. The output of the light computational portion is fed through the feedback line F back to the multiplexer 34. The multiplexer 34 alternatively selects one of the data D1, or the output D3 of the light computational portion 32. A latch 37 is connected to the input of the light computational portion. Data D4 operated to the data from such sources as the high speed memory is input through the latch 37 to the light computational portion 32.

A multiplexer 38 is connected to the address input of the high speed memory 31. An address signal A0 is input directly through the latch 39 to the multiplexer 38. The address input directly input to the multiplexer 38 is compared with the address signal A1 through the latch 39 in the comparator 40 which generates a comparator signal COMP1.

Figure 22:
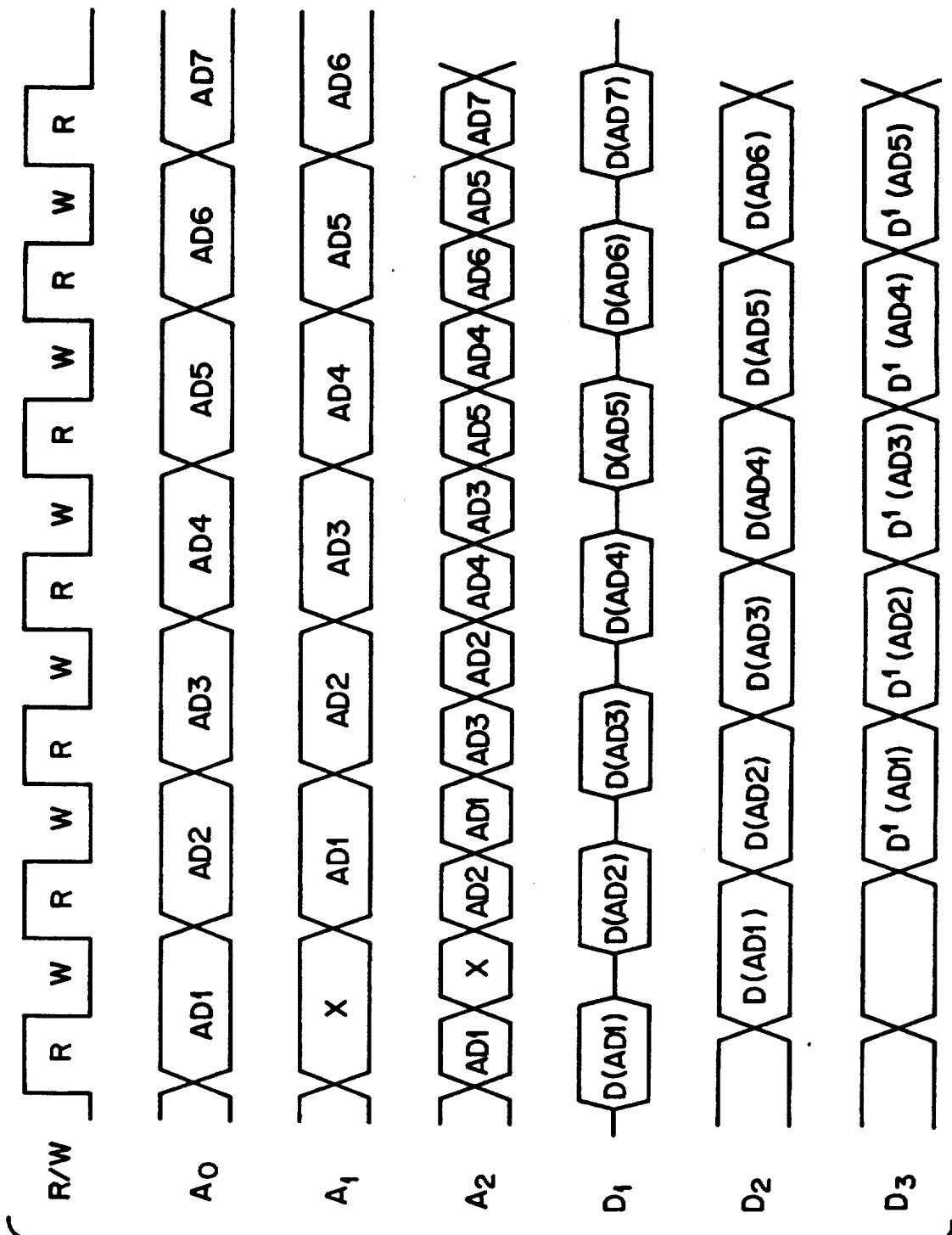
FIG. 22 shows a time chart of the embodiment in FIG. 21.

FIG. 22 shows a timing chart of the converting portion when it operates in the previously described pipeline processing technique. The read/write signal (R/W in FIG. 22) is cyclically changed from read to write and from write to read. The converting portion itself operates synchronously to this read/write signal. The address signal A0 is input repeatedly so as to designate one address in every read/write cycle (one read period and one write period). The latch 39 generates a signal identical to, but delayed by one read/write cycle, from the signal A0. The multiplexer 38 generates the signal A0 or A1 alternately in every half of the read/write cycle (one read period or one write period) and inputs the generated signal to the address input of the high speed memory 31. The high speed memory outputs data D1 from the data output Dout according to the address A1 input during the read period.

When the address A0 is changed in every read/write cycle as shown in FIG. 22, for example, address from AD1 to AD7 can be successively designated, and the data D1 is transmitted through the multiplexer 34 and latch 35 to the light computational portion 32 which calculates the data D1. The calculation result D3 of the light computational portion 32 is transmitted through the latch 36 and the selector 33 to the memory 31 and is written in the same address as that of data D1. As shown in FIG. 22, during the read/write period next to the period when the address AD1 is designated, the address AD1 is designated for writing. Therefore, the read data is written in the same address in a proper timing after the calculation.

The read/write cycle above is inadequate for designating the same address A0 repeatedly, because on the second read address designation the calculated data is not yet written in the memory. Therefore, a repeated calculation can be performed for every two cycles of the read/write cycle. To effect this, the repeated calculation of the data calculated in the light computational portion is fed through the feed back line F back to the latch 35.

Figure 23:
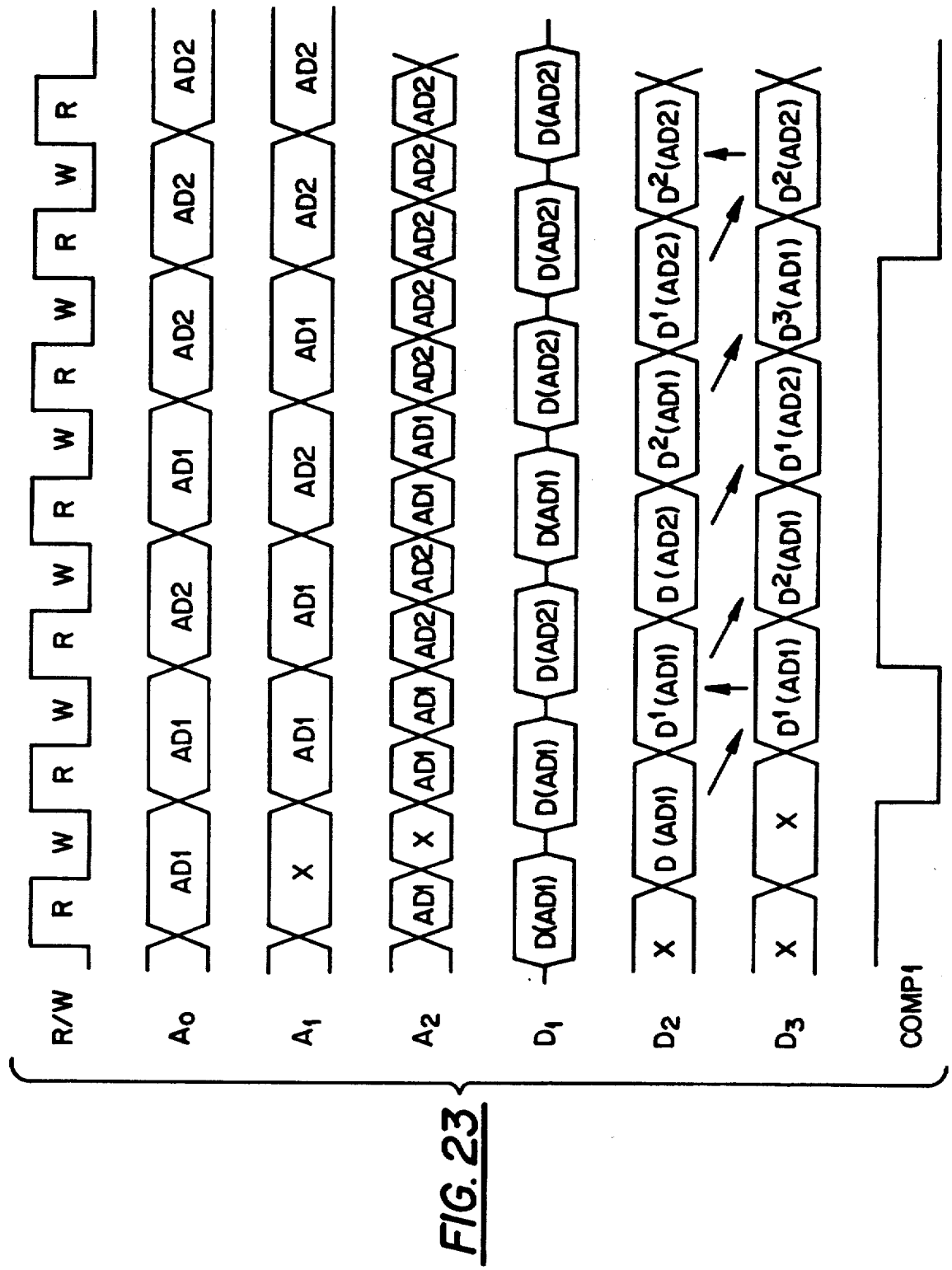
FIG. 23 shows another time chart of the embodiment in FIG. 21.

FIG. 23 shows a timing chart of such calculation. The same address AD1 is repeatedly generated two times in a row, followed another address AD2 being designated. Then, the former address AD1 is designated again and then the latter address AD2 is designated again. The addresses A0 and A1 are compared in the comparator 40, which generates a compare signal COMP1. The signal COMP1 is, for example, low level when the addresses coincide. The signal COMP1 is input to the multiplexer 34 as a control signal. The multiplexer 34 outputs the data from the feedback line F when the COMP1 is a low level. The output data is input immediately through the latch 35 to the light computational portion. The light computational portion outputs the calculation result on the next read/write cycle. The data in the address AD1 is calculated two times and then rewritten in the address AD1. The data of next address AD2 is calculated one time and then rewritten in the address AD2. On the next designation of AD1, the data calculated two times is stored in the address AD1. The data is read out again and calculated one time. On the next repeated designation of AD2, the calculated data is fed through the feed back line F back to the latch 35 and is repeatedly calculated.

Due to such construction, the output of the light computational portion 32 is fed through the feed back line F back to the input of the light computational portion 2, and a repeating calculation on every cycle can be executed.

Figure 24:
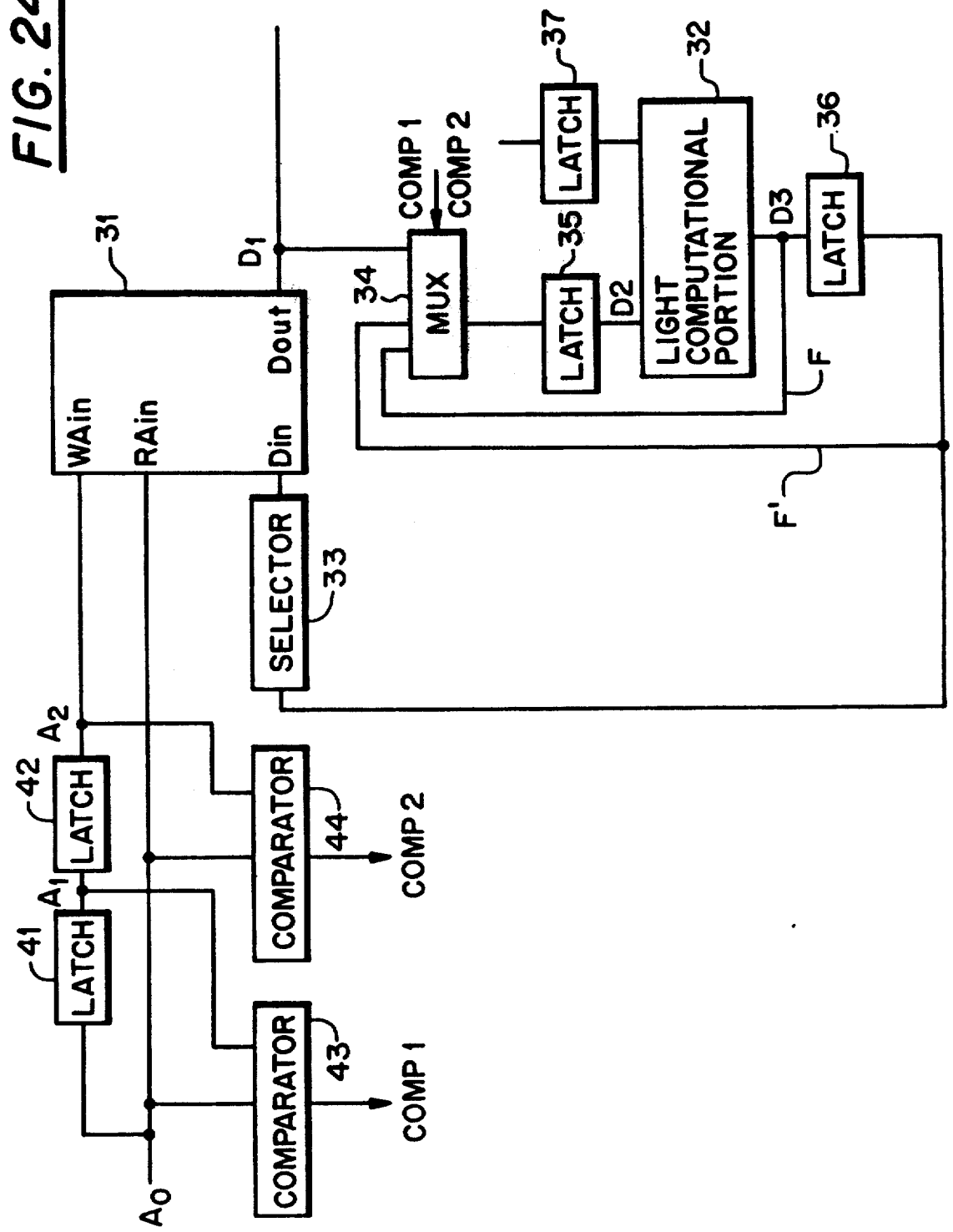
FIG. 24 shows a block diagram of the second embodiment.

FIG. 24 shows a second embodiment of the feedback type of converting portion. A memory available for reading and writing simultaneously is applied as a high speed memory. A so-called dual port memory or multi-port memory is one memory of such type. In this embodiment, the similar portions to that of the first embodiment are designated by the same references.

One difference of this embodiment from the first is that the multiplexer 34 connected to the output of the memory 31 has three inputs and the output of a latch 36 after the light computational portion 32 is fed through a second feedback line F' back to the multiplexer 34. The multiplexer 34 alternatively selects one of the memory data D1, the output of the light computational portion 32 or the output of the latch 36.

Data A0 is directly input to the read address input RAin of the memory 31 and is input through the latches 41 and 42 to the write address input of the memory 31. The write address input WAin receives the address A2, which is identical to but delayed by two read/write cycles, from the address signal A0. The signal delayed by one cycle in the latch 41 is designated hereafter as A1. The signals A0 and A1 are compared in the comparator 43 and the signals A0 and A2 are compared in the comparator 44. The outputs COMP1 and COMP2 of the comparators 43 and 44 are input to the multiplexer 34 as control signals. The multiplexer 34 selects which one of the above three data to output, according to these control signals. If the signals COMP1 and COMP2 are at a low-level when the input addresses coincide, the relationship between the data selected by the multiplexer 34 and the control signals is as follows:

TABLE 1

| COMP1 | COMP2 | Output of the multi-plexer |
|---|---|---|
| 0 | 0 | data from F |
| 0 | 1 | data from F |
| 1 | 0 | data from F' |
| 1 | 1 | data D1 |

Figure 25:
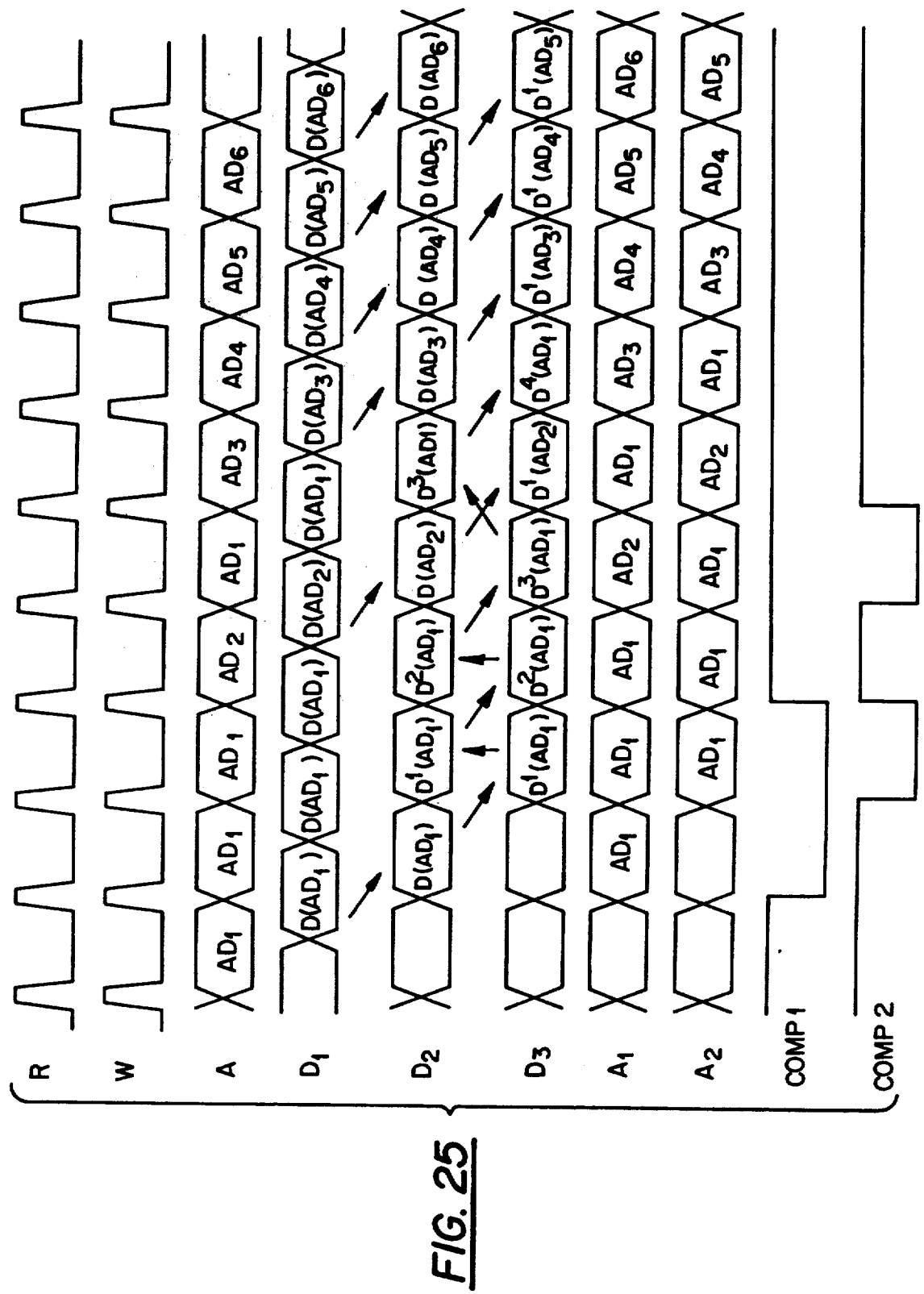
FIG. 25 shows a time chart of the embodiment in FIG. 24.

FIG. 25 shows the timing chart of this embodiment. The address AD1 is designated three times repeatedly, then another address AD2 is designated one time, then the former address AD1 is designated again one time and then other addresses AD3 and AD4 are designated.

When the data in the address AD1 is held in the latch 35 and the same address is designated again, the signal COMP1 becomes a low level so that the output of the light computational portion 32 is fed through the feedback line F back to multiplexer 34. The data D in the address AD1 is calculated three times in the light computational portion 32 and then the calculation result D3 is output from the latch 36. During the following cycle, another address AD2 is designated and then the address AD1 is designated again. The signal COMP1 becomes a high level and the signal COMP2 becomes a low level so that the data from the feedback line F' is selected. The data D1 is the address AD2 is once held in the latch 35 and then calculated three times. The calculation result is held in the latch 35 as soon as the data D of the address AD2 is calculated in the light computational portion 32. On the next cycle, the data D' of the address AD2 calculated one time is written in the address AD2. While the data D3 of the address AD1 calculated three times is input again to the light computational portion 32, to be calculated.

Due to the provision of the second feedback line F', the data can be calculated repeatedly even in the critical condition that the same address is repeatedly designated in every cycle.

Due to the memory performance being simultaneously readable and writable, the basic cycle of the converting portion can be diminished to be half of that of the first embodiment. The calculation speed is extremely high because of the high speed cycle and the pipe-line construction of the converting portion.

It maybe easily understandable that the construction of the above embodiment can be applied to any variation or application of the converting portion.

Figure 26:
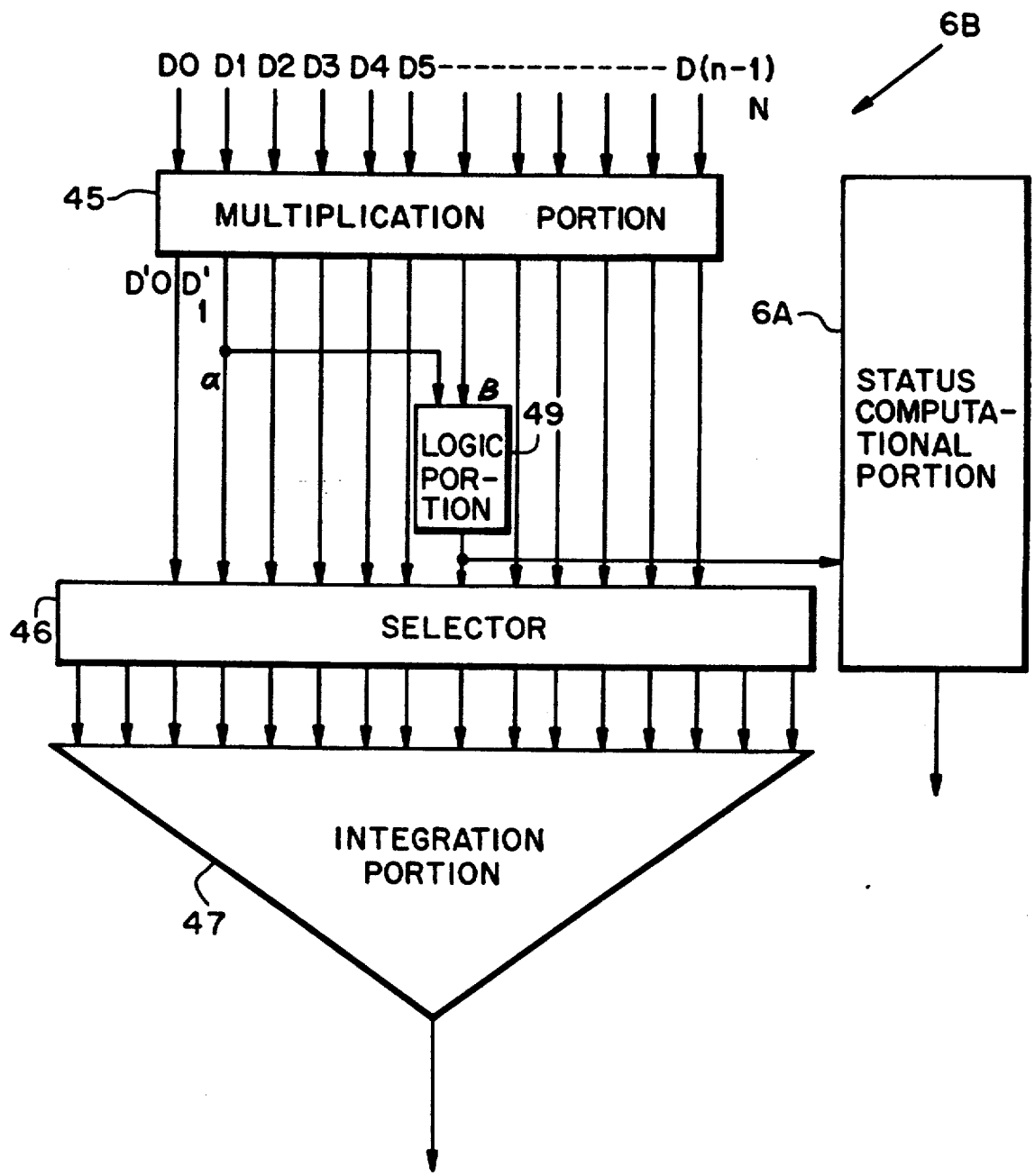
FIG. 26 shows a block diagram of the first embodiment of the computational circuit.

FIG. 26 shows in detail a first embodiment of the numerical computational portion 6B of the computational portion 2 in FIG. 5. Numerical computational portion 6B comprises a multiplication portion 45, a data selector 46 and an integration portion 47, all connected successively in series. The multiplication portion 45 has N inputs for data labeled D0, D1, ..., D(N−2) and D(N−1). Each item of data input thereto is multiplied by a respective multiplier which will be called A0, A1, ..., A(n−1) by the multiplier 45, so as to generate outputs D'0, D'1, ..., D'(N−1) as:

$$D'0 = A0 \cdot D0$$
$$D'1 = A1 \cdot D1$$
$$\ldots$$
$$D'-1) = A(N-1) D(N-1)$$

This yields a number of weighted output data equal to the number of input data.

Figure 27:
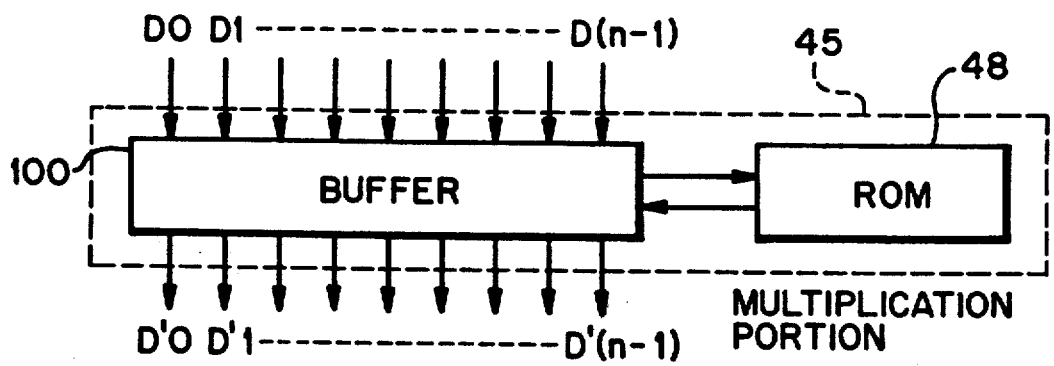
FIG. 27 shows a block diagram of variation of the embodiment in FIG. 25.

FIG. 27 shows one possible configuration of multiplication portion 45. A look-up table is pre-computed and stored in a ROM (read only memory) 48. The data D0 ... D(N−1) is supplied to a buffer 100, which is used to address the ROM 48. The output of ROM 48 is supplied to the output circuits of the buffer to provide a look-up table function.

The result is that the multiplication of $D'i = Ai \times Di$ may be obtained by reading data from ROM 48 including the look-up table in which a plurality of multiplication results have already been accumulated, as shown in FIG. 27.

The selector 46 must have a number of inputs at least as great as the number of multiplication lines. Selector 46 has a number of outputs equal to (N+N') or N' more than that of the inputs. The selector 46 operates such that it can introduce the multiplication result of any input to any of the outputs thereof, or distribute any one of its inputs to any plurality of outputs. The integration portion 47 has at least (N+N') inputs, similar in number to the number of outputs of selector 46. Integration portion 47 integrates the multiplication result by addition or by any other calculation.

Since a multiplication module usually includes a large number of logical gates, multiplication has been known in the art as a slow and inefficient process. It is better to decrease the number of multiplication modules in order to improve total gate efficiency of a system. This embodiment minimizes the number of the multiplication modules to be a number equal to that of the inputs, so that the circuit is constructed as simply as possible. According to the long practical experience of the inventor of this invention, a same input parameter is never multiplied by a weighing factor with a different absolute value in practical image processing. Therefore, the inventor has found it possible to construct a circuit such as shown in FIG. 26 which is optimized to have a number of inputs similar in number to the number of inputs. Since the selector 46 introduces each inputted parameter to any one of the inputs of integration portion 47, and distributes each parameter to any one input of the integration portion, a large number of different kinds of image processing may be executed without modifying the integration portion.

The computational portion has a pipe-line processing type architecture. When one multiplication result is transmitted to the selector 46, the next parameters are inputted to the multiplication portion 45. In order to improve the processing speed of the multiplication portion, a modified array-logic circuit or any other high speed multiplication circuit, and a pipe-line processing type architecture may be employed. A Wallace-tree circuit can also be used, which is a well-known multiplier circuit that simultaneously calculates a carry.

The selector 46 transmits the result of the multiplication to the proper input of integration portion 47.

Integration portion 47 has a hierarchical pipe-line processing architecture in which various calculations are conducted in parallel and simultaneously executed on each hierarchy, and the calculation results are transmitted to the next hierarchy. The numerical computational portion as a whole is much improved in processing speed by this pipe-line architecture.

The logic portion 49 is connected to some of the outputs of the multiplication portion 45. Logic portion 49 performs a logical operation on these outputs. This logical operation may be AND, OR, EX-OR, NOP, NAND, NOR, EX-NOR, NOT and/or combinations of them. For example, when a logical operation between two images is to be performed, the following calculation may be possible, wherein a value of a pixel in one image is $\alpha$ and the value in another image $\beta$.

i) AND ... $\alpha \times \beta$

In binary images, only the pixels whose pixel value are commonly "1" on the corresponding coordinates in two images are extracted. In multi-level images, only the pixels in the images are extracted which have corresponding coordinates and same values in common bit with each other.

ii) OR ... $\alpha + \beta$

In binary images, pixels of two images are extracted which have corresponding coordinates the value of at least one pixel is "1". As to the multi-level images, the pixels of two images are extracted whose coordinates correspond and at least one of which has a bit of "1".

iii) EX-OR ... $\alpha \oplus \beta$

As to both binary and multi level images, the pixels are extracted which have corresponding coordinates but different in value from each.

iv) NOP

In FIG. 26, the output of the logic portion 49 is connected to the input of the selector 46 corresponding to the output $\beta$ of the multiplication portion 45; when NOP (no operation), the output $\alpha$ or $\beta$ of multiplication portion is inputted to this corresponding portion as is.

The NAND, NOR EX-NOR and NOT are executions of a reverse logic as compared with the above.

Figure 28:
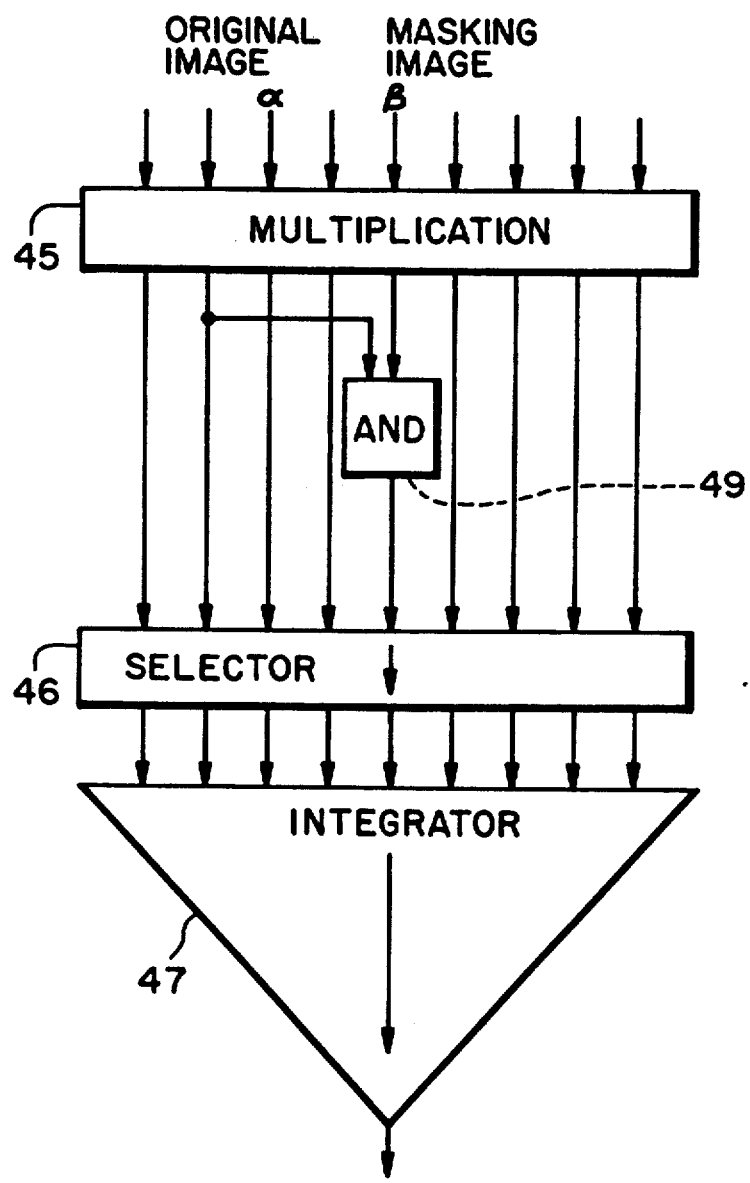
FIG. 28 shows a block diagram of the first embodiment of a logic portion.
Figure 29:
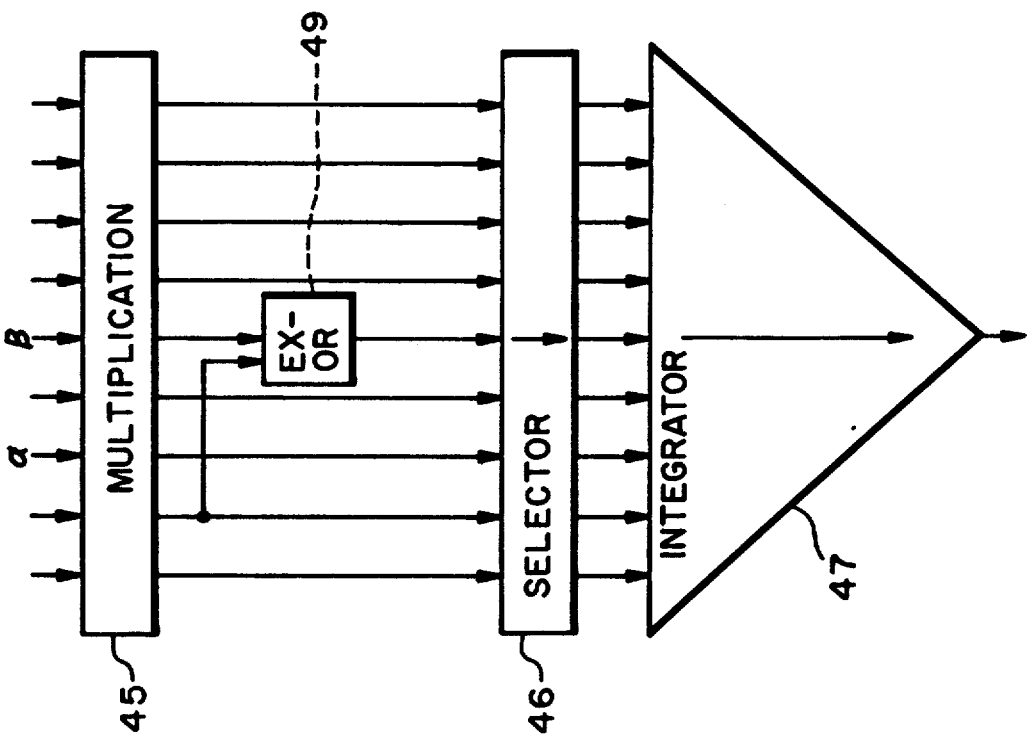
FIG. 29 shows a block diagram of the second embodiment of a logic portion.

The operation of AND in i) is useful for masking, for example as shown in FIG. 28. When the original image is α and the masking image is β, and β=1 or 0, only the pixels of the original image to pixels of the masking image whose value β=1 are passed through the logic portion. By the operation of EX-OR in iii), as shown in FIG. 29, it is possible to extract pixels of two images which are different in value. This usefully produces the moving objects. An image on a point of time may be α and an image on the next point of time is β.

Figure 30:
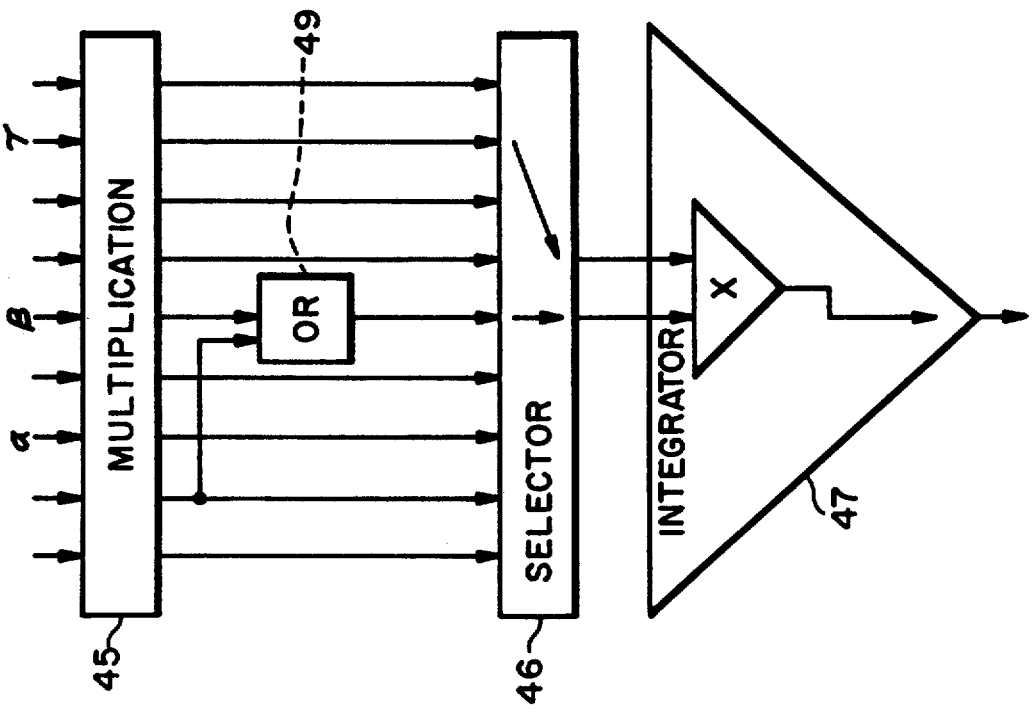
FIG. 30 shows a block diagram of the third embodiment of a logic portion.

FIG. 30 shows a processing for three images; there is operated OR of image α and β in the logic portion 49, and the image τ is multiplied by the result of the operation. When the image τ is a masking image, the pixels of images α and β whose value is not less than "1" and those among the pixels corresponding to the area designated by the masking image are extracted.

Besides the operation using a logic portion, many other kinds of operation can be performed using only the multiplication portion 45, selector 46 and integration portion 47 as follows.

Figure 31:
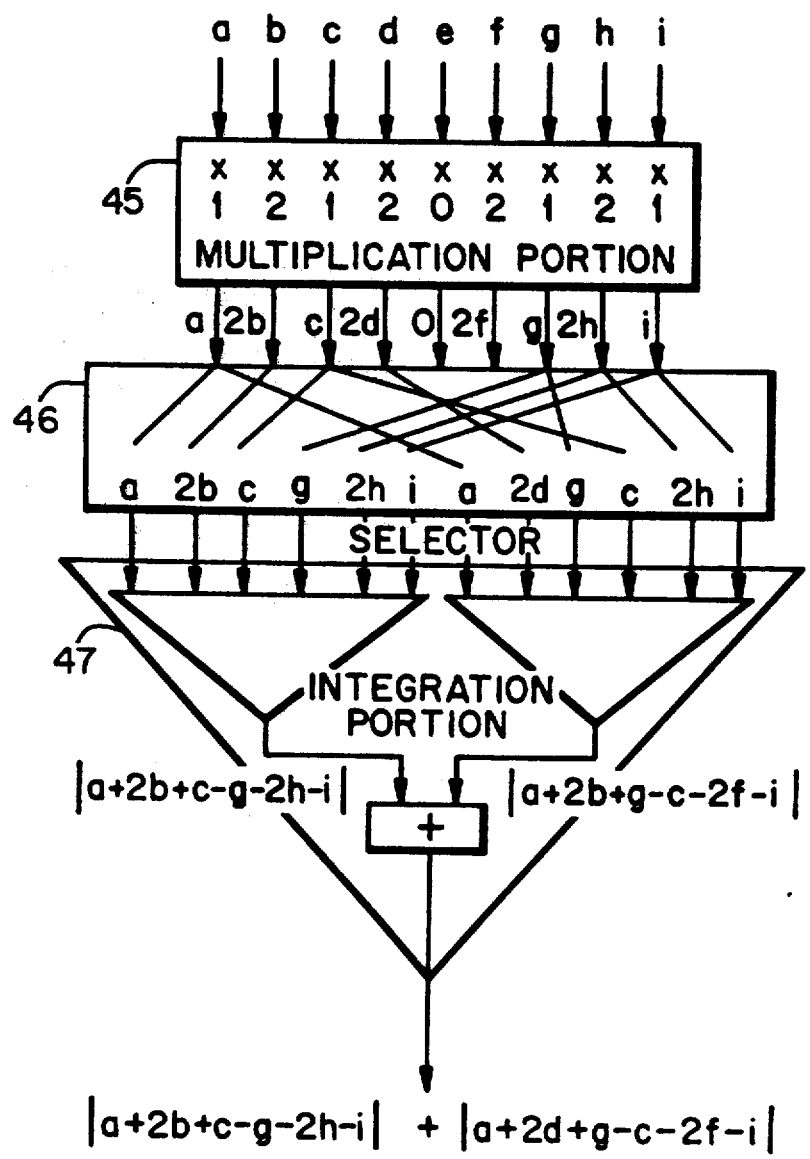
FIG. 31 shows a block diagram of the first example of a computational portion without a logic portion.

FIG. 31 shows the multiplication portion 45 showing the performance of the circuit when a SOBEL operator is to be calculated. The SOBEL operator is an operator which enhances the edge of the image. The density of the center pixel is changed to a value given by a summation of density around the center pixel multiplied by coefficients. The SOBEL operator is well-known in the art and is expressed as: in the x direction $$\Delta x f(i,j) = f(i-1,j-1) + 2f(i-1,j) + f(i-1,j+1) - \{f(i+1,j-1) + 2f(i+1,j) + f(i+1,j+1)\}$$

in the y direction $$\Delta y f(i,j) = f(i-1,j-1) + 2f(i,j-1) + f(i+1,j-1) - \{f(i-1,j+1) + 2f(i,j+1) + f(i+1,j+1)\}$$

Pixel data of 8 adjacent pixels (upper, lower, right, left, upper right, upper left, lower right and lower left) for a 3×3 convolution area is inputted into numerical computation portion 45 from convolution processing portion. The multiplication portion 45 of this embodiment receives each parameter and multiplies this parameter by the SOBEL multipliers in the accompanying chart to perform the operating function.

TABLE 2

| The multiplier of SOBEL operator | | | | | | | | |
|---|---|---|---|---|---|---|---|---|
| parameter | a | b | c | d | e | f | g | h | i |
| multiplier | 1 | 2 | 1 | 2 | 0 | 2 | 1 | 2 | 1 |

The result of this multiplication is input to selector 46 which introduces or distributes the multiplication result of twelve output terminals, each being designated by a reference numerical of one to twelve in Table 3. The value derived from each output terminal is also shown below in Table 3. The values derived from the terminals 1 to 6 and the values derived from the terminals 7 to 12 are integrated, respectively. Both results of integration are then further integrated to obtain the final result shows as "results of integration 2" in Table 3.

TABLE 3

| Output terminal | The process of calculation of the SOBEL operator | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| derived | a | 2b | c | g | 2h | i | a | 2d | d | c | 2h | i |

TABLE 3-continued

| Output terminal | The process of calculation of the SOBEL operator | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| value result of integration | 1 | $\|a + 2b + c - g - 2h - i\|$ | | | | | $\|a + 2d + g - c - 2f - i\|$ | | | | | |
| result of integration | 2 | $\|a + 2b + c - g - 2h - i\| + \|a + 2d + g - c - 2f - i\|$ | | | | | | | | | | |

Figure 32:
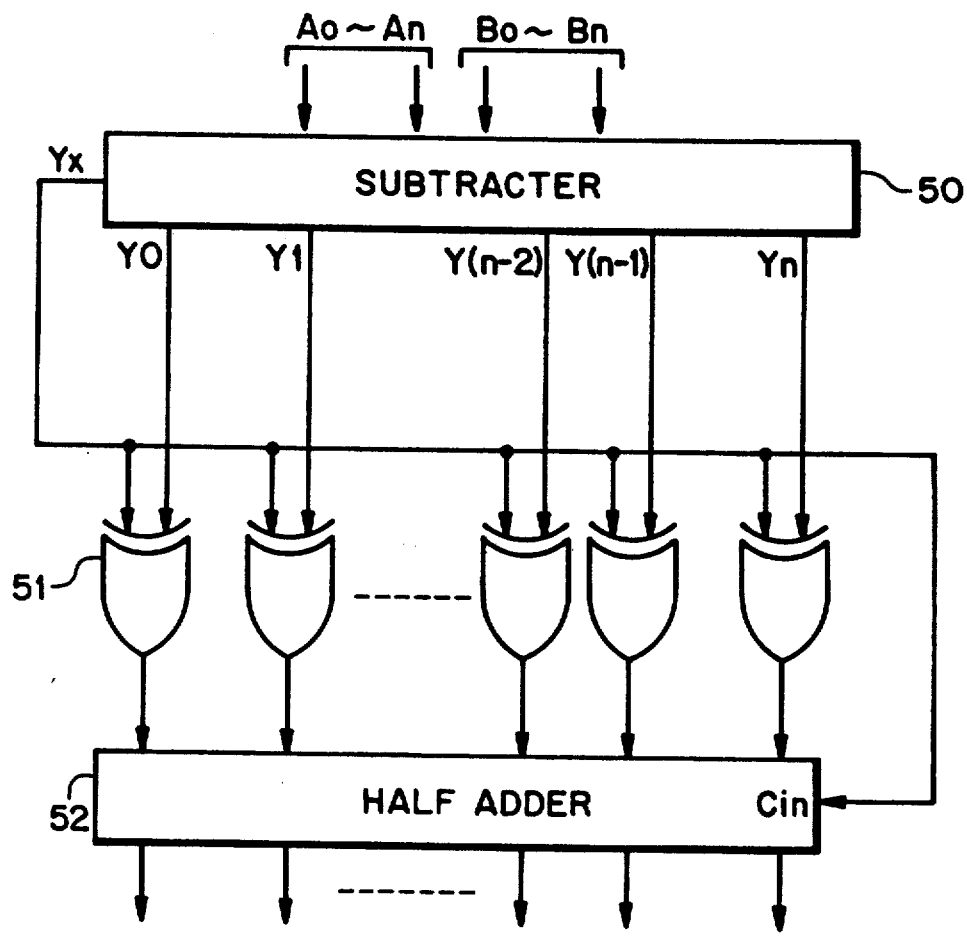
FIG. 32 and FIG. 33 show block diagrams of calculation modules in the integration portion.
Figure 33:
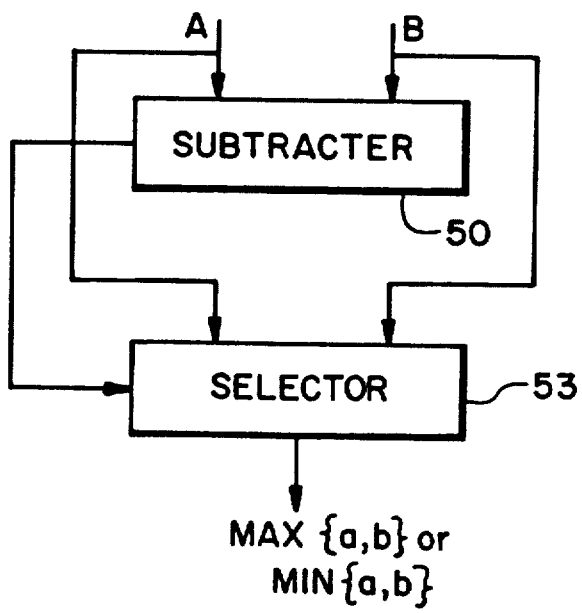

The integration portion of this embodiment can also perform addition, subtraction, calculation of the absolute value of the difference, maximum abstracting, minimum abstracting, sign inversions, and bit shifting, etc. to produce a final output for various purposes. For instance, maximum and minimum abstraction can be performed in order to calculate the length of a chord of a configuration. The length of a horizontal line within and across a configuration is designated as a horizontal line chord length $i_h$ or a vertical line vertical chord length $i_v$. This has known uses in image processing which are known and will not be elaborated herein. The circuits for the above calculation are constructed, for example, as shown in FIG. 32 and FIG. 33. FIG. 32 shows a circuit for calculating an absolute value of the difference between values. The input of an EX-OR (exclusive or) gate 51 is connected to the output of subtracter 50. The output of EX-OR gate 51 is connected to the input of a half adder 52. Two sets of (N+1) bits of data, A0 to An and B0 to Bn, are inputted to subtracter 50. The difference between the two sets is output as Y0 ... Yn, each to one input of each EX-OR gate 51. A sign bit Yx (x between 0 and n) is produced by subtracter 50, and is input to the other input of each EX-OR gate 51. The sign bit Yx is also inputted to the carry-input C of half-adder 52. When sign bit Yx is "1", that is to say, the output of subtracter 50 is negative, each of the output bits Y0 to Yn are inverted, and then the sign bit "1" is added to the inverted result. Thus, a value which is equal to the input value with its sign inverted is produced as an output value. Therefore, the absolute value is determined. Conversely, when the sign is positive, the output of subtracter is not inverted because the sign bit is "0". The absolute value is therefore the non-inverted data which is output.

FIG. 33 shows a circuit for abstracting maximum and minimum. A selector 53 is connected to the output side of a subtracter 50. Parameters A and B are input to the selector 53 which are to be compared with one another therein. The value of the result of subtraction (A−B) is input to selector 53. One of the values is output from the selector 53 according to the sign of the result of subtraction (A−B). When the device is to be used for abstracting a maximum, A is output when the sign is plus or zero and B is output when the sign is minus. Conversely, in the case of abstracting a minimum, B is output when the sign is plus, and A is output when the sign is minimum or zero.

Figure 34:
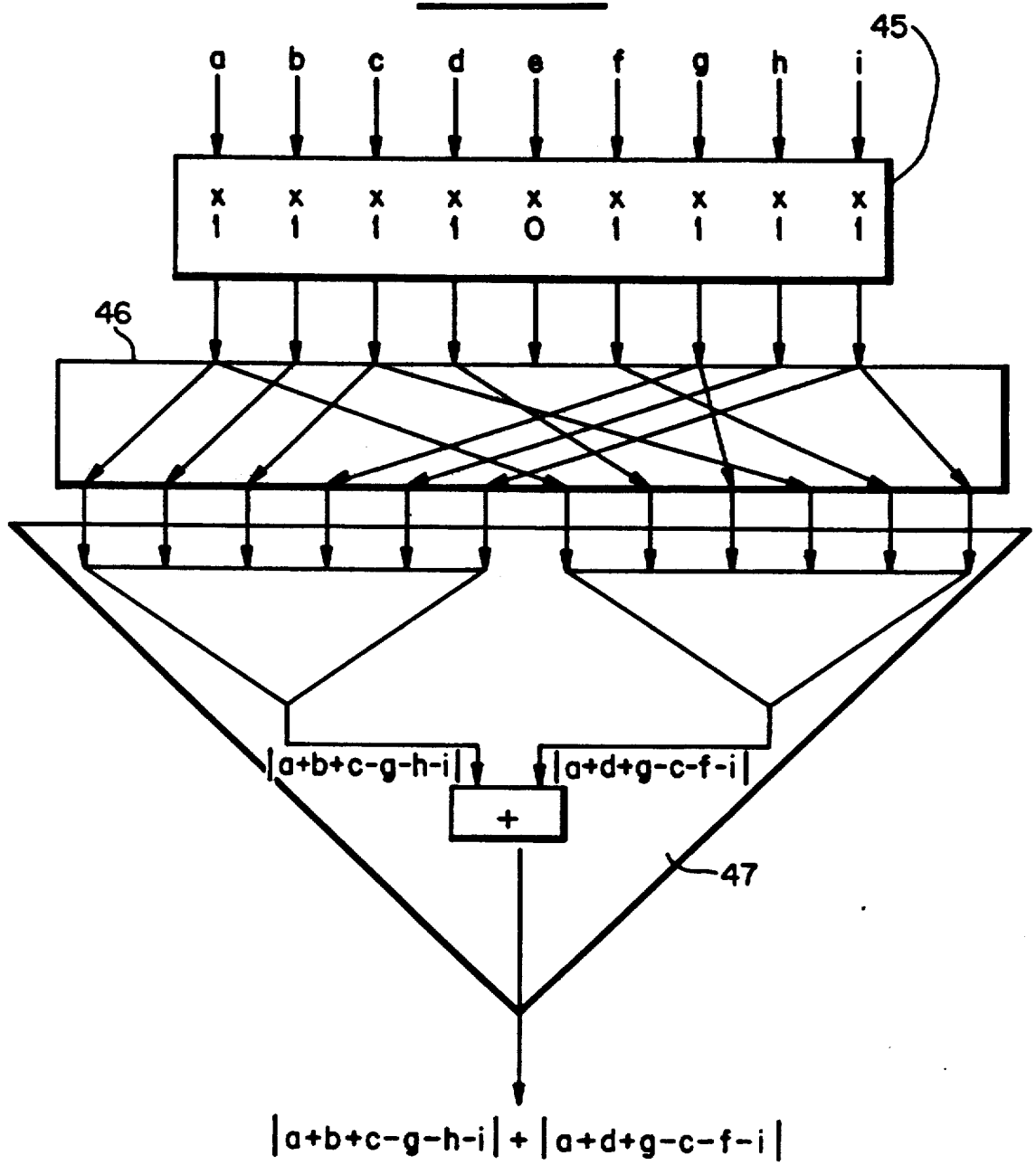
FIG. 34 shows a block diagram of the third example of a computational form.

FIG. 34 shows a fourth embodiment of computational portion 6B, which is used for calculating the so-called Prewitt operator. The Prewitt operator is based on a similar concept to the SOBEL operator but uses different coefficients from those of the SOBEL operator. The Prewitt operator is defined as follows: in the x direction $$\Delta x f(i,j) = f(i-1,j-1) + f(i-1,j) + f(i-1,j+1)$$
$$- \{f(i+1,j-1) + 2f(i+1,j) + f(i+1,j+1)\}$$

in the y direction $$\Delta y f(i,j) = f(i-1,j-1) + f(i,j-1) + f(i+1,j-1)$$
$$- \{f(i-1,j+1) + 2f(i,j+1) + f(i+1,j-1)\}$$

The multipliers, the values derived on each output terminal and the result of integration 1 and 2 are as follows:

TABLE 4

Multipliers of PREWITT operator

| parameter | a | b | c | d | e | f | g | h | i |
|---|---|---|---|---|---|---|---|---|---|
| multiplier | 1 | 1 | 1 | 1 | 0 | 1 | 1 | 1 | 1 |

TABLE 5

The process of calculation of the PREWITT operator

| Output terminal | 1 | 2 | 3 | 4 | 5 | 6 | 7 | 8 | 9 | 10 | 11 | 12 |
|---|---|---|---|---|---|---|---|---|---|---|---|---|
| derived value | a | b | c | g | h | i | a | d | g | c | f | i |
| result of integration 1 | |a + b + c − g − h − i| | | | | | |a + d + g − c − f − i| | | | | |
| result of integration 2 | |a + b + c − g − h − i| + |a + d + g − c − f − i| | | | | | | | | | | |

The PREWITT operator is calculated by the operation shown in the above Table.

The following tables show multipliers for other various operations, including values derived by each output terminal and results of integration.

The Laplacian operator is shown in Tables 6 and 7. The Laplacian enhances the edge of an image dependent of the direction of the edge. This Laplacian operator is defined according to the following equation $$\Delta^2 f(i,j) = \Delta^2_x f(i,j) + \Delta^2_y f(i,j)$$
$$= \{\Delta_x f(i+1,j) - \Delta_x f(i,j)\} + \{\Delta_y f(i,j+1) - \Delta_y f(i,j)\}$$
$$= f(i+1,j) + f(i-1,j) + f(i,j+1) + f(i,j-1) - 4f(i,j)$$

and is used for specialized functions in image processing.

TABLE 6

The multiplier of Laplacian

| parameter | a | b | c | d | e | f | g | h | i |
|---|---|---|---|---|---|---|---|---|---|
| multiplier | 0 | 1 | 0 | 1 | 4 | 1 | 0 | 1 | 0 |

TABLE 7

The process of operation of Laplacian

| Output terminal | 1 | 2 | 3 | 4 | 5 | 6 | 7 | 8 | 9 | 10 | 11 | 12 |
|---|---|---|---|---|---|---|---|---|---|---|---|---|
| derived value | — | b | — | d | 4e | f | — | h | — | — | — | — |
| result of integration 1 | |b + d − 4e + f + h| | | | | | | | | | | |

Tables 8 and 9 shows multipliers used for a sharpening operation. Images sometimes lose their sharpness due to deficiencies in high frequency components. To make an image more distinct, a high frequency component compensation, known as sharpening, is sometimes performed. A high frequency filter for sharpening is defined by the following equations and is shown in Tables 8 and 9.

$$g(i,j) = f(i,j) - \Delta^2 f(i,j)$$
$$= 5f(i,j) - \{f(i+1,j) + f(i-1,j) + f(i,j+1) + f(i,j-1)\}$$

TABLE 8

The multiplier for sharpening

| parameter | a | b | c | d | e | f | g | h | i |
|---|---|---|---|---|---|---|---|---|---|
| multiplier | 0 | 1 | 0 | 1 | 5 | 1 | 0 | 1 | 0 |

TABLE 9

The process of operation of sharpening

| Output terminal | 1 | 2 | 3 | 4 | 5 | 6 | 7 | 8 | 9 |
|---|---|---|---|---|---|---|---|---|---|
| derived value | — | b | — | d | 5e | f | — | g | — |
| result of integration 1 | |−b − d + 5e − f − g| | | | | | | | |

Other similar operations are shown in Tables 10–13.

TABLE 10

The first modification of the second state differential

| parameter | a | b | d | d | e | f | g | h | i |
|---|---|---|---|---|---|---|---|---|---|
| multiplier | 1 | 1 | 1 | 1 | 8 | 1 | 1 | 1 | 1 |

TABLE 11

The process of operation of the above second state differential

| Output terminal | 1 | 2 | 3 | 4 | 5 | 6 | 7 | 8 | 9 |
|---|---|---|---|---|---|---|---|---|---|
| derived value | a | b | c | d | 8e | f | g | h | i |
| result of integration 1 | |a + b + c + d − 8e + f + g + h + i| | | | | | | | |

TABLE 12

The second modification of the second state differential

| parameter | a | b | d | d | e | g | g | h | i |
|---|---|---|---|---|---|---|---|---|---|
| multiplier | 1 | 2 | 1 | 2 | 4 | 2 | 1 | 2 | 1 |

TABLE 13

The process of operation of the second state differential of the second modification

| Output terminal | 1 | 2 | 3 | 4 | 5 | 6 | 7 | 8 | 9 |
|---|---|---|---|---|---|---|---|---|---|
| derived value | a | 2b | c | 2d | 4e | 2f | g | 2h | i |
| result of integration 1 | |a − 2b + c − 2d + 4e − 2f + g − 2h + i| | | | | | | | |

When using this image processor for smoothing a video picture, each value of the neighboring pixels are multiplied by "1", and the value of the pixel to be processed is weighted by a multiplier of greater than or equal to 1. The total value of the pixels of the center and the neighbors are averaged. The processes of these calculations are executed in the same manner as described above.

In order to only perform the logic calculation it is not always necessary to arrange the logic portion 49 behind the multiplication portion 45. This is because data usually goes without operation through the multiplication portion 45 (executing an operation called NOP) on to the logical calculation. However, it is necessary to provide a latch for the input or output data to or from every multiplication module, in order to process at high speed using pipe-line processing architecture as a whole. A latch to input data to the logic portion is necessary when the logic portion 49 is provided before the multiplication portion 45. When the logic portion 49 is arranged behind the multiplication portion 45, the latch on the output side of the multiplication portion 45 is also used for the latch on the input side of the logic portion 49, and the latch on input side of the selector 46 is also used for the latch on the output side of the logic portion 49. The gate efficiency is by this expedient remarkably increased.

As described hereafter, by introducing the status computational portion 6A shown in FIG. 26 in addition to the numerical computational portion and logic portion, the image processing system obtains a much wider usage. FIG. 26 shows that the status computational portion 6A is connected to the branch of the output of the logic portion 49, and that both results of multiplication and logic computation can be input to the status computational portion.

Figure 35:
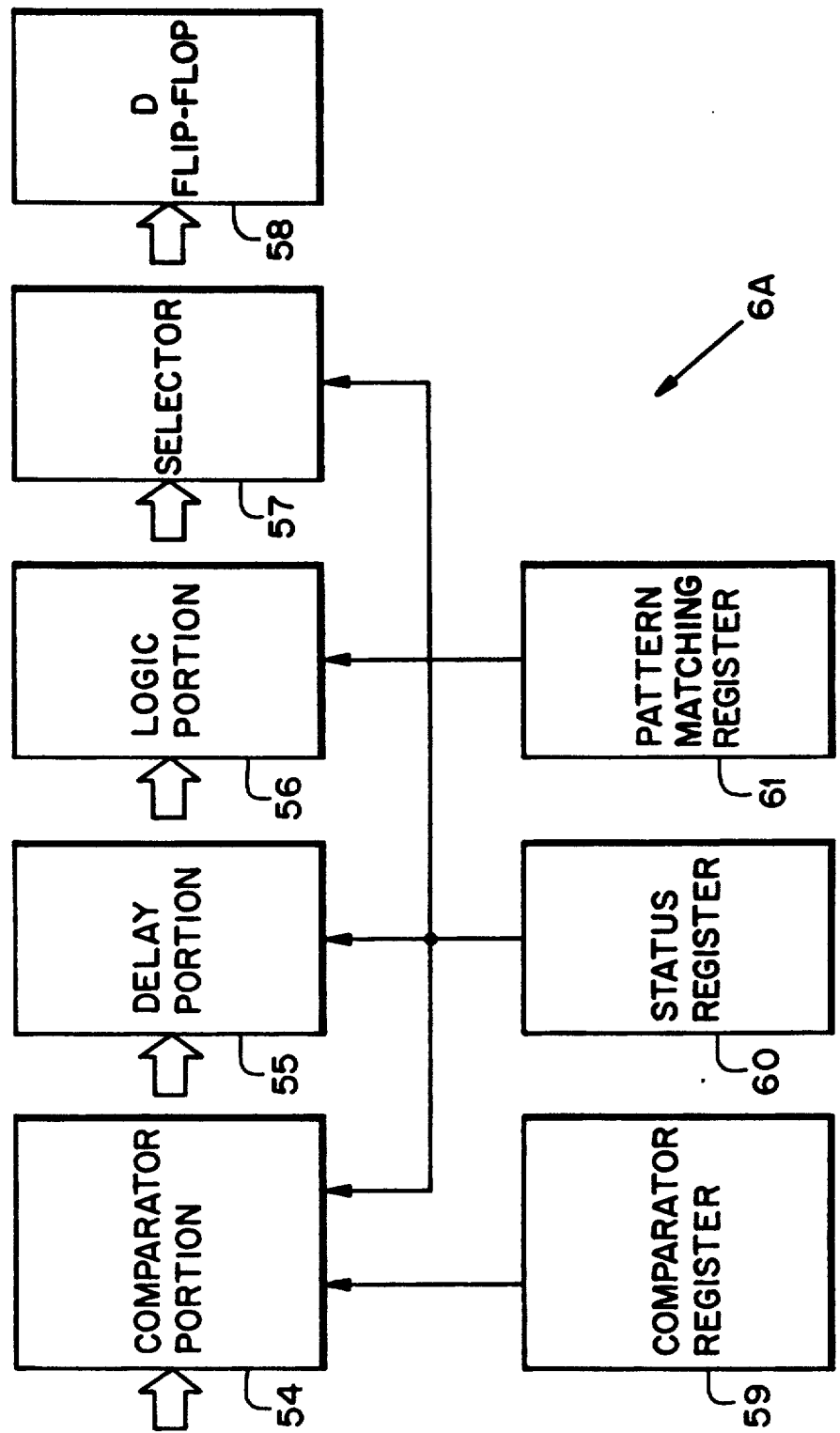
FIG. 35 shows a block diagram of a status computational portion.

FIG. 35 shows the status computational portion 6A comprising comparator portion 54, a delay portion 55, a logic portion 56, a selector 57 and a D flip-flop 58, connected in series. The comparator portion 54 functions to make the pixel data binary, which data is outputted from numerical computational portion. The binarizing threshold is stored in the comparator register 59. The comparator portion 54 outputs a pixel data of "1" or "0" by comparing the threshold and the pixel data.

The delay portion 55 is provided for setting a timing of the output of the status computational portion 6A. When pipe-line processing is performed as a whole, the output of numeric computational portion 6B should be synchronized with the output of the status computational portion 6A, and synchronized with the following processing system. The delay timing in the delay portion 55 is stored in the status register 60. The contents of the status register 60 are changed according to the processing to be performed. The logic portion 56 performs various logical computations necessary for image processing, including various computations such as number of connectedness, Euler number, etc. which are performed in one clock cycle. The pattern matching register 61 is connected to the logic portion 56, and the template pattern for calculating the "matching ratio", by comparing a convolution of pixel data with the template pattern, is stored in the register 61. The logic portion 56 performs the various calculations and outputs the result thereof at the same time. The selector 57 selects only a necessary calculation result. D flip-flop 58 receives the final signals, and is the latch for pipe-line processing; output data is held here once, and outputted.

Due to the construction for the processing logic computation, pattern matching and so on which are impossible to be processed in the numeric computational portion by the hardware which performs pipe-line processing, the image processing system has remarkably wide usage and high speed.

As shown in the above embodiments, the numerical computational portion performs multiplication first, and then introduces or distributes the multiplication first, and then introduces or distributes the multiplication result to arbitrary input terminals of a integration portion to effect its functions. High gate efficiency is achieved, and the system can be easily extended and improved because the construction of the circuit is quite simple.

The number of input pixel data is not limited by the aforementioned embodiments: this invention is effective for a number of pixels more than or less than the 3×3 pixels. The larger the number of input pixel data, the more remarkable the effectiveness becomes.

Figure 36:
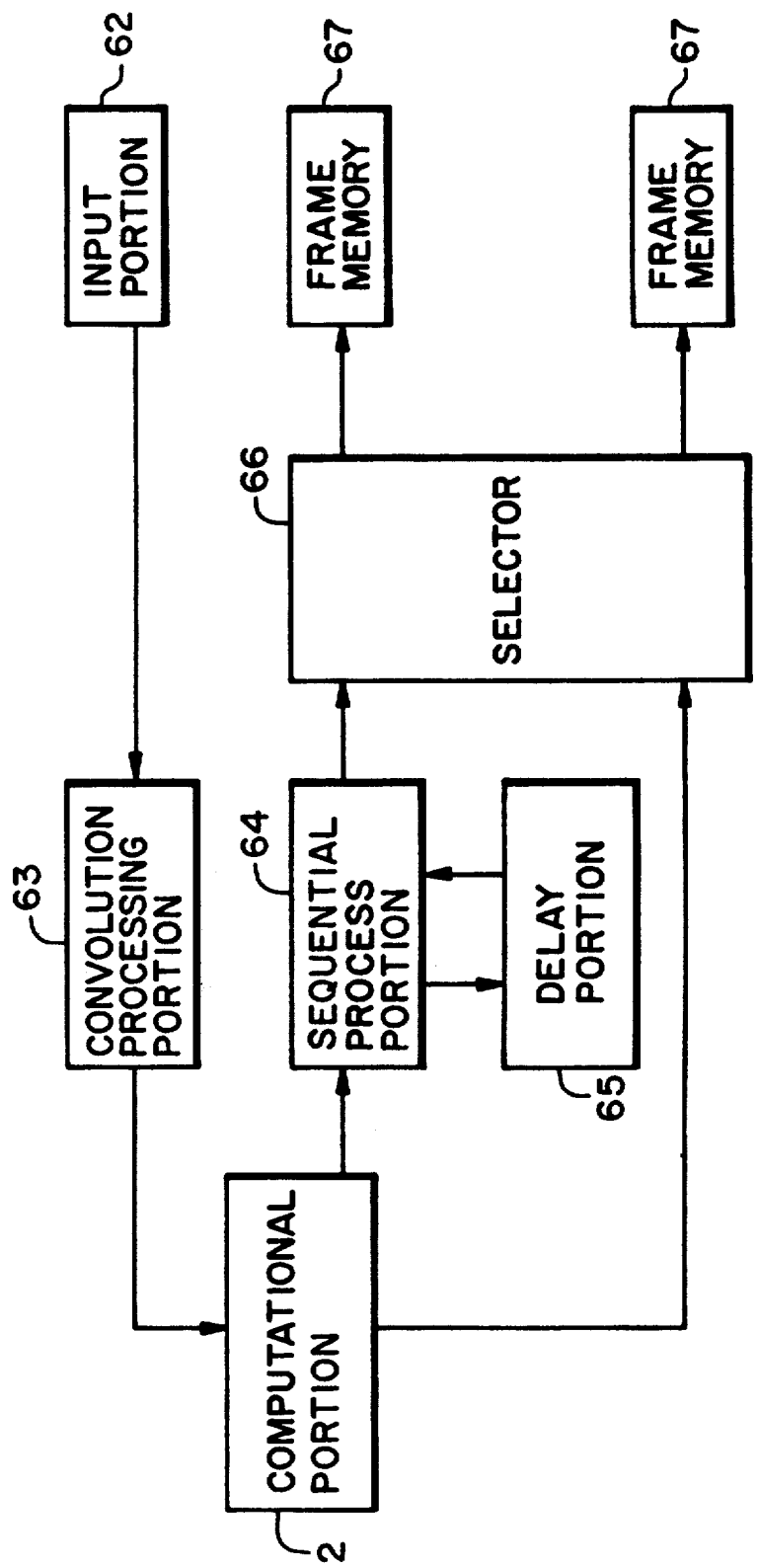
FIG. 36 shows a block diagram of the third embodiment of the image processing system.

FIG. 36 shows an image processing system including a sequential process portion.

Figure 37:
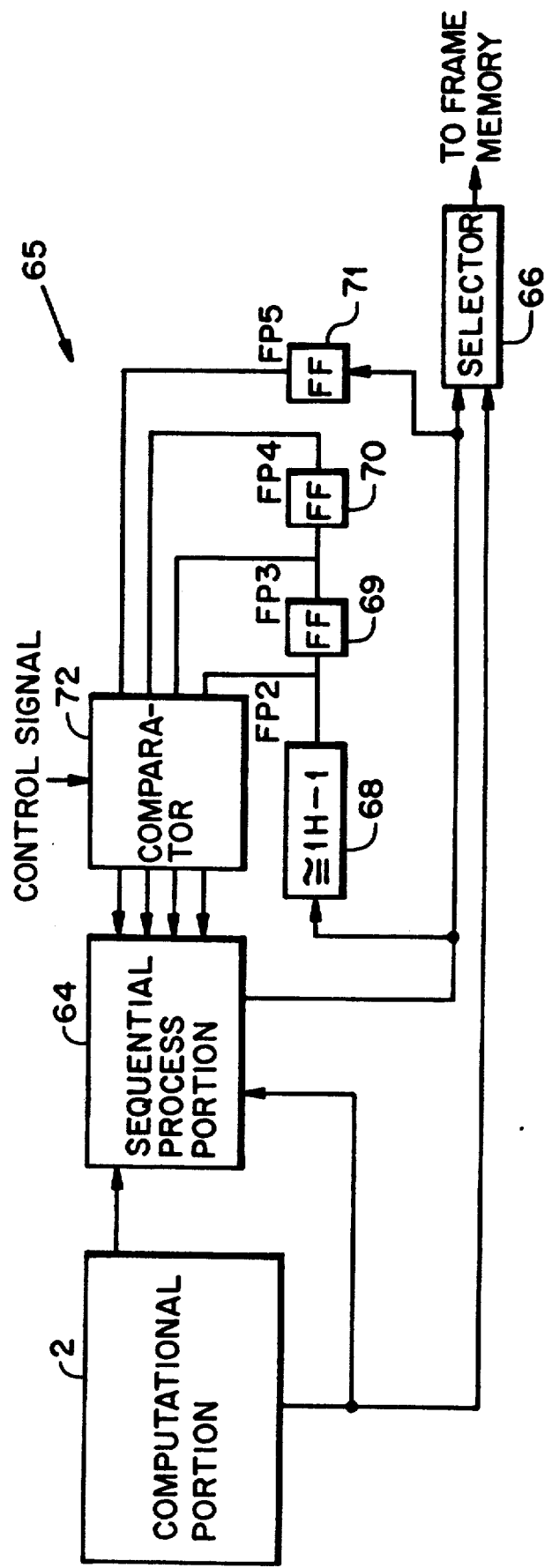
FIG. 37 shows a detailed block diagram a delay portion.

The sequential process portion 64 is connected with a delay portion 65. The sequential process portion receives a signal from the computational portion 2 and from the delay portion 65. The delay portion 65 is shown in detail in FIG. 37. The delay portion 65 includes a line memory 68 for storing one scan line of the output from the sequential process portion 64. Flip-flops 69 and 70 are connected in series to the line memory 68, and delay the output from the line memory 68 by one clock cycle.

The sequential process is explained hereafter by changing the reference designations of pixels in the 3×3 convolution area for easy understanding, as follows:

| | |
|---|---|
| $P_{i,j} =$ | P0 |
| $P(i+1), j =$ | P1 |
| $P(i+1), (j-1) =$ | P2 |
| $P_{i}, (j-1) =$ | P3 |
| $P(i-1), (j-1) =$ | P4 |
| $P(i-1), j =$ | P5 |
| $P(i-j), (j+1) =$ | P6 |
| $P_{i}, (j+1) =$ | P7 |
| $P(i+1), (j+1) =$ | P8 |

When the pixel P2 is processed, the pixel density is designated as FP2, P3 as FP3, P5 as FP5 and so forth. The line memory 68 stores pixel data of at least one scan line of pixels, subtracted by one. The line memory 68 together with the flip-flops 69 and 70 store one scan line of pixels so that the processed data from FP2 to FP4 in the above 3×3 area are stored. The delay portion 65 further includes flip-flop 71 connected to the output of the sequential process portion 64 parallel to the line memory 68. The flip-flop 71 stores the processed pixel FP5 to which the pixel P0 follows in order. Then, the processed pixels from FP2 to FP5 corresponding to pixels from P2 to P5 are totally stored. All stored pixels are fed back to the sequential process portion 64 and unprocessed pixels from P6 to P8 are delivered to the sequential process portion 64. These pixels are the whole of the data necessary for a sequential process of 3×3 convolution area processed in the sequential process portion 64.

The output of the line memory 68, and flip-flops 69 to 71 are input to a comparator 72. The comparator 72 judges whether each of the pixels from FP2 to FP5 has a predetermined density. A result of the judgement or the values of pixels from FP2 to FP5 themselves is input to the sequential process portion 64. The comparator 72 is preset by a control signal in correspondence with the process to be processed by the sequential process portion 64. The processed result of the sequential process portion 64 is input to the line memory 68 and the flip-flop 71, so that the process result contributes the following process in the sequential process portion 64. The processed result is transmitted through the selector 66 to the frame memory 67. The selector 66 selects the process result of the sequential process portion 64 or the output of the computational portion 2 alternatively and transmits the selected one to the frame memory 67.

The sequential process is necessary for processes such as thinning and labelling. Thinning can be processed by perfectly parallel processing. Such parallel processing needs scanning in various directions during one time process for distinguishing one pixel layer from boundary pixels. This requires a lot of process time. A sequential-type thinning has advantages in processing time, but has proven difficult to be executed by hardware without deteriorating its general utility. In this embodiment, the hardware of sequential processing portion is independent from the computational portion, so that the thinning process is efficiently executed while maintaining the general utility of the total system.

When the sequential process portion executes thinning, the following judgments must be evaluated.

i) Whether the object pixel (center pixel) does not have background density. The background density is usually "0". This judgement is executed not through a sequential process, but rather a parallel process.

ii) Whether the object pixel is the boundary pixel. This judgement is executed not through a sequential process but rather a parallel process.

iii) Whether the object pixel is an end point or an isolated point. In other words, the judgement i) is "yes" and the number of pixels among pixels from P1 to P8 with different density from that of P0 is "7" or "8". This judgement is executed through not a sequential process but rather a parallel process.

iv) Whether the number of connectedness of the object pixel is "1". This judgement is executed through a sequential process. When the labelling is executed the following judgement is executed.

i) Whether the object pixel has or does not have a background density. This judgement is executed through a parallel process.

ii) Whether none of processed pixels from FP2 to FP5 have a labelling number. If so, the object pixel is given a new labelling number. This judgement is executed through a sequential process.

iii) Whether one or more of the processed pixels from FP2 to FP5 have one and the same labelling number. The object pixel is given the same labelling number. This judgement is executed through a sequential process.

iv) Whether some of the processed pixels from FP2 to FP5 have different labelling numbers. The object pixel is given one of the labelling numbers. The different numbers are stored as the same group. This judgement is executed through a sequential process.

As mentioned above, the system includes sequential process portion 64, which is independent from the computational portion 2, and must be able to execute sequential process by means of both of the computational portion and the sequential process portion when a sequential process is necessary, without decreasing the breadth of its utility. Since the comparator in the delay portion can be preset to various levels, various types of sequential processes can be executed.

When the sequential process portion is replaced with other sequential process portions, or when a plurality of sequential process portions can be selectively connected, a much greater variety of sequential processes can be executed.

Hereafter, some constructions concerning the frame memory are explained. According to the present invention, the frame memory is skillfully controlled and used. That is to say, scrolling, and masking can be skillfully performed and the read and write cycle of the frame memory can be efficiently generated.

Heretofore, there is provided a frame memory for storing a total image and a video RAM for storing a partial image to be displayed out of the total image. The video RAM is gradually rewritten for displaying the scrolled image. This process is useful in practice for scrolling the speed to change the area displayed. However, for calculation between two images scrolled and unscrolled and for some other kinds of image processing, extremely high speed scrolling is necessary. In such a case, the conventional scrolling is not practical.

Figure 38:
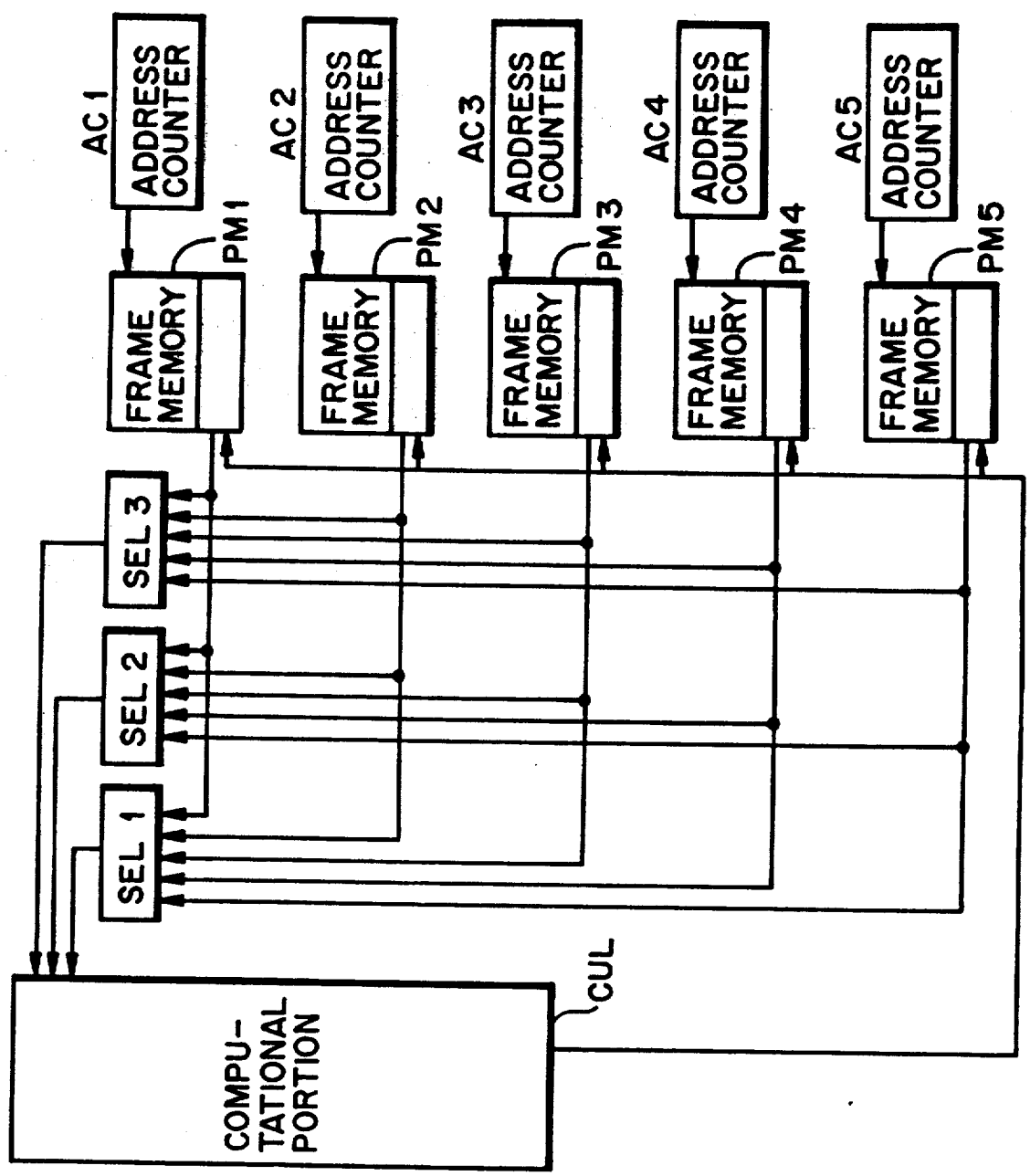
FIG. 38 shows a block diagram of an embodiment of the image processing system.

In FIG. 38, the image processing system includes a plurality of frame memories, PM1 to PM5. The outputs of the frame memories are input in parallel to a plurality of selectors, SEL1 to SEL3. The outputs of the selectors are input to a computational portion CUL which executes a calculation between the images output from the selectors.

Each frame memory is controlled by address counters AC1 to AC5 for designating the read and write address. The read address of the frame memory PM1 and the write address of the frame memory PM2 are preset to be shifted in one of the column direction or the row direction. Then, the image in the frame memory PM1 is transmitted to the frame memory PM2 so that a shifted image of the image in PM1 is written in the frame memory PM2. The computational portion CUL performs no calculations during this process, and the pixel data from the frame memory PM1 passes through the computational portion without calculation. Next, the images in the frame memories PM1 and PM2 are transmitted through the selectors SEL1 and SEL2 to the computational portion CUL. The computational portion executes a calculation between images from PM1 and PM2 and transmits the calculation result to the frame memory PM3 and so forth. Then the image in PM3 is stored in the frame memory PM4 with the shifting in the column direction or row direction, and the images in the frame memories PM3 and PM4 are calculated. By reading the image from one frame memory and simultaneously writing while shifting, and by repeating this reading and writing, extremely rapid scrolling can be executed. When the computational portion is constructed as a pipe-line processor, the calculation between images can be processed at high speed.

The scrolling has wide application. For example a large scale smoothing is executed by scrolling.

Figure 39:
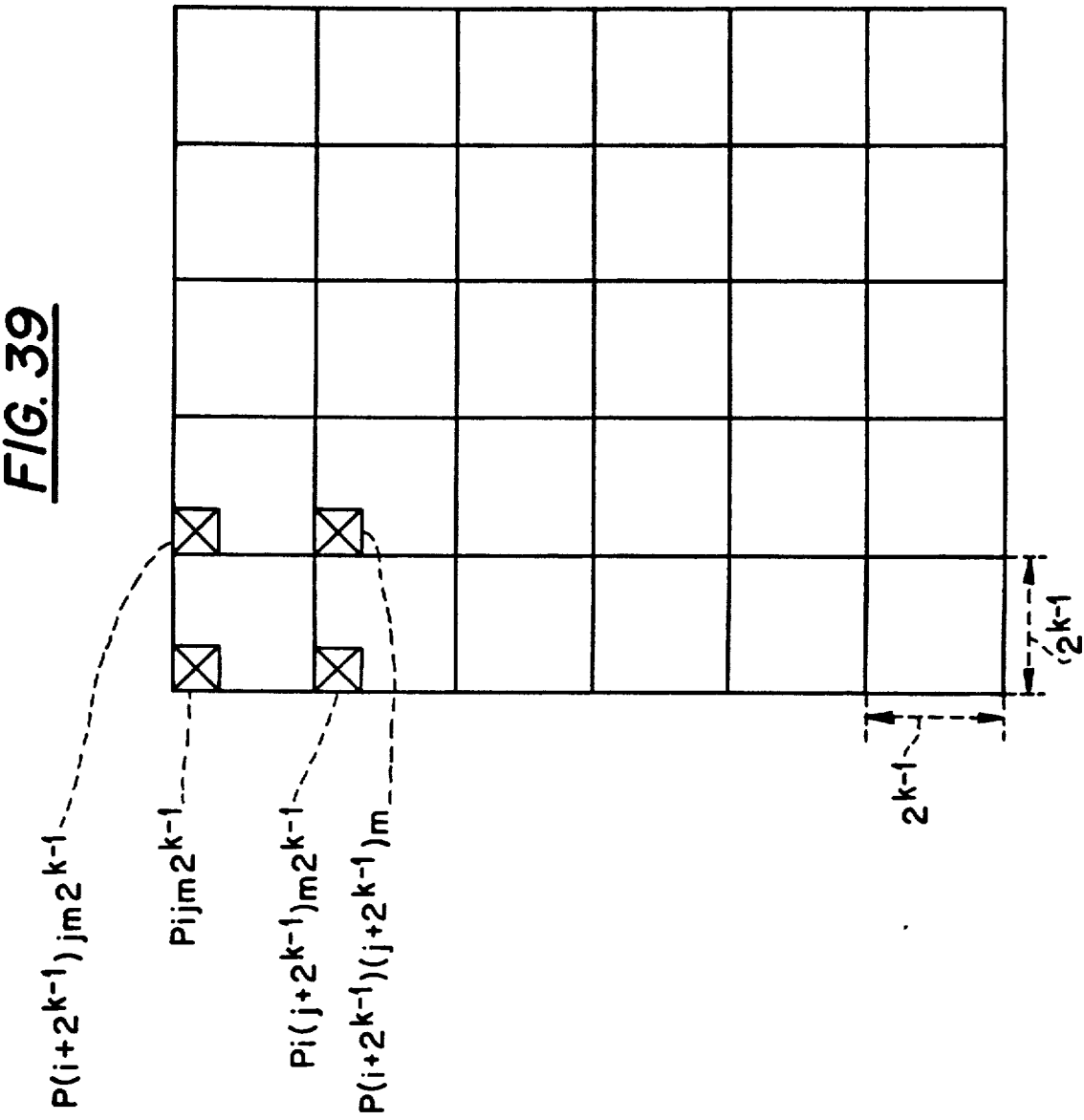
FIG. 39 shows a concept of the processing means when the image area of $2^k \times 2^k$ is smoothed from a smoothed image area of $2^{k-1} \times 2^{k-1}$.

When there is an image smoothed by a size of $2^{k-1} \times 2^{k-1}$, an image smoothed by a size of $2^k \times 2^k$ can be easily obtained by scrolling by $2^{k-1}$ pixels in the column and row direction. These scrolled three images and the original smoothed image are averaged, as shown in FIG. 39. This means that each four pixels remote by a distance of $2^{k-1}$ in the direction of column or row are averaged, and the averaged density is given to one of the pixels, for example the upper left pixel. The averaging calculation is as follows:

$$P_{ij}m2^k = \{P_{ij}m2^{k-1} + P_{(i+2^{k-1})j}m2^{k-1} + P_{i(j+2^{k-1})}m2^{k-1} + P_{(i+2^{k-1})(j+2^{k-1})}m2^{k-1}\}/4 \quad (1)$$

Figure 40A:
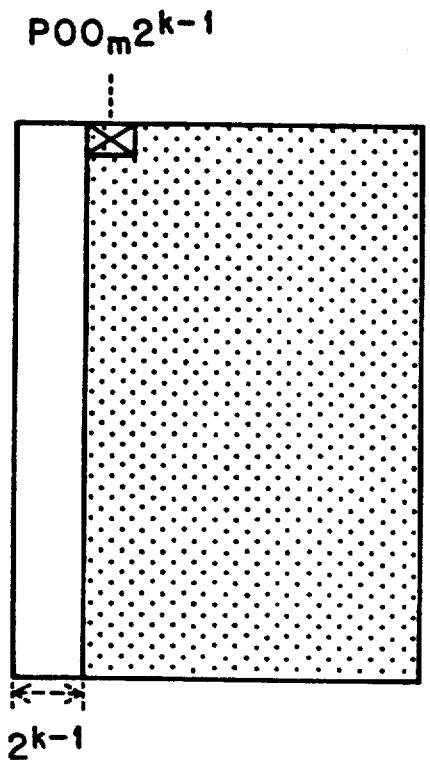
FIG. 40 (A) shows the concept of the result after being scrolled in the row direction by the same distance of $2^{k-1}$ pixels in FIG. 39.
Figure 40B:
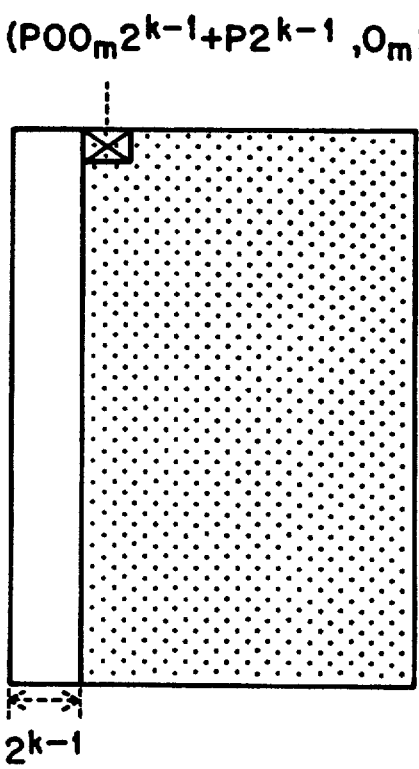

The image in FIG. 40(A) is stored in the frame memory PM1, the shifted image by $2^{k-1}$ in the column direction is stored in the frame memory PM2, and each average density of corresponding pixels of both images is calculated by the computational portion CUL. The calculated average is stored in the frame memory PM3. The generated image is shown in FIG. 40(B).

Figure 40C:
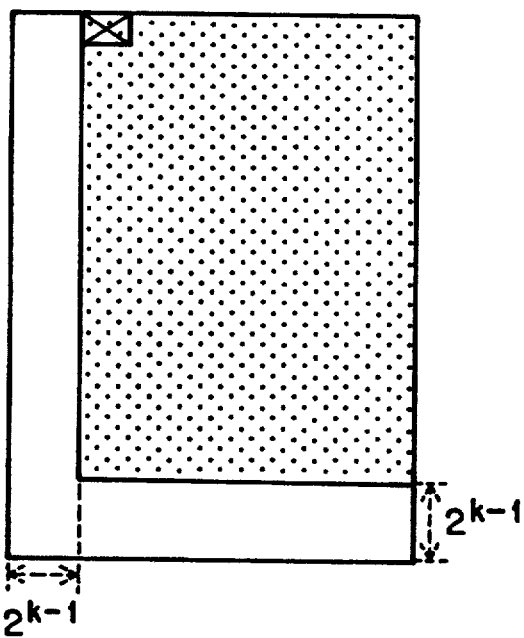

The image in PM3 is written with shifting by $2^{k-1}$ in the row direction into the frame memory PM4 as shown in FIG. 40(C). Then, the images in the frame memories PM3 and PM4 are averaged and written in the frame memory PM5. The averaged image in PM5 is the average value calculated by the formula (1). Therefore, $(k-1)$ times scrolling in the column and row direction is necessary for the smoothing of the size of $2^{k-1} \times 2^{k-1}$ and k times scrolling in both direction is necessary for $2^k$ size smoothing.

For improving the efficiency of the process, two scrolled images are generated simultaneously and next one scrolled image is read with shifting by $2^{k-1}$ and calculated with another scrolled image. Then one time of scrolling is omitted.

When there is provided a kxk convolution processing portion, the area of $(k-1) \times (k-1)$ pixels can be simultaneously averaged. The averaged image is scrolled by k pixels in the column and row direction and the average density therebetween is calculated. Since the convolution process portion usually has a size of $3 \times 3$, the image processing system is available for $4 \times 4$ sized smoothing without scrolling. The scrolling is usually very important for smoothing of an image having a size greater than $4 \times 4$.

When it is necessary to extract the predetermined area during the displaying or processing a predetermined area of an image, a process called "masking" is used.

Heretofore, the masking has been executed by software or by a specialized graphic processor. The processing by software is poor in process speed and the processing by a specialized processor is narrowly limited in terms of its usage and functions. For example, a graphic processor has a faculty for displaying the number of square area of any position and with any size. However, this is unable to display an area of shape other than a square and is unable to display a plurality of areas.

Figure 41:
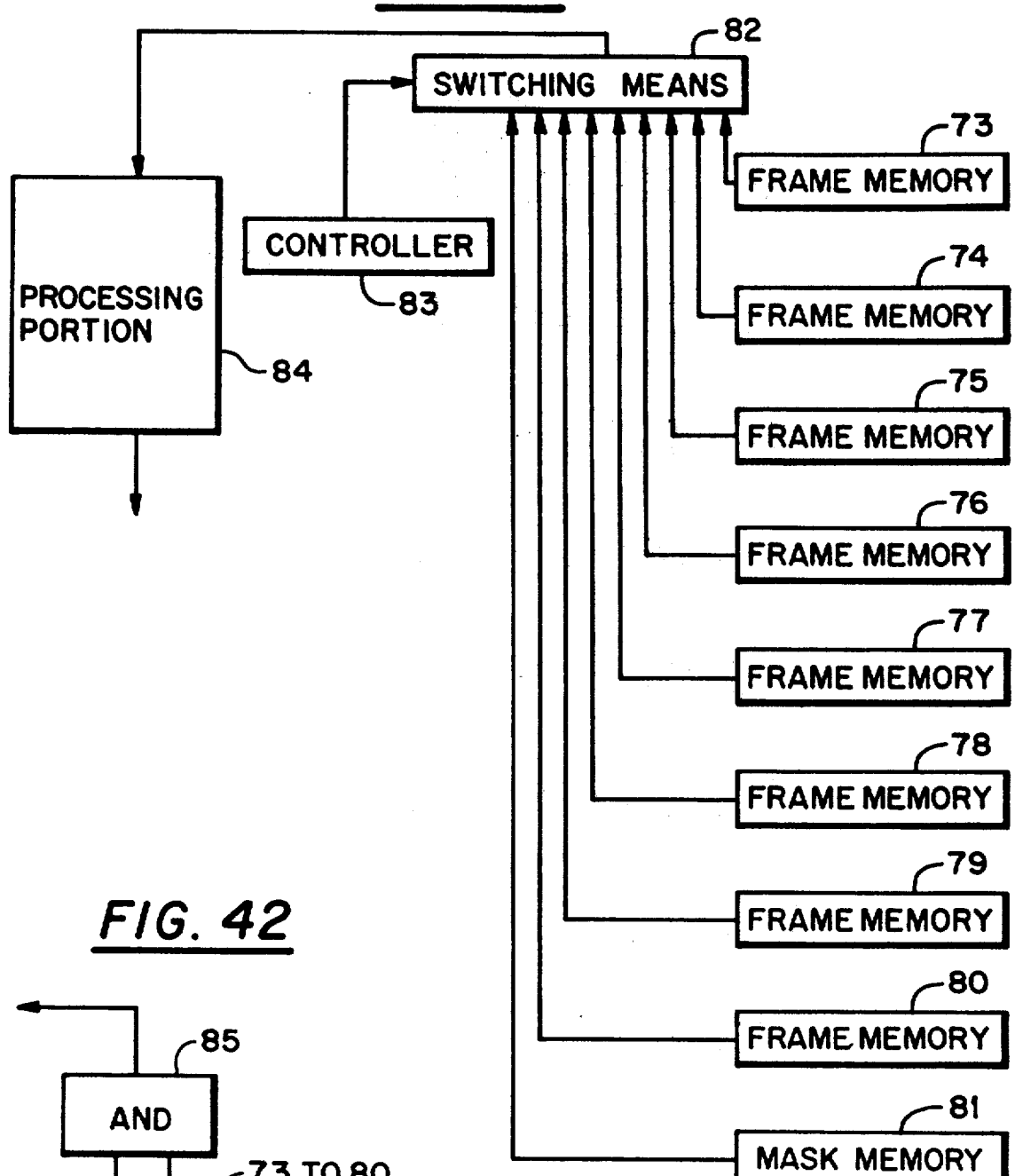
FIG. 41 shows a block diagram of the fourth embodiment of the image processing system.

FIG. 41 shows an embodiment of an image processing system according to the present invention. A plurality of frame memories from 73 to 80 and a mask memory 81 are connected to selecting means 82. The selecting means 82 selectively passes the pixel data of one of the frame memories from 73 to 80 to the processing portion 84 or prevents the data from passing. Mask memory 81 has addresses corresponding to those of the frame memories. The mask memory 81 stores data, for example, of "1" or "0". The selector 82 passes data on the address corresponding to the address of the mask memory address, where "1" is stored, and prevents the data from passing corresponding to the address of the mask memory where "0" stored. A controller 83 is connected to the selector 82. The controller 83 selects one of frame memories whose data is to be passed through the selector.

Any shape and any size of masking pattern can be stored in the mask memory, and can be easily changed. Thus, a lot of types of masking can be executed. Since the mask memory is readable as fast as the frame memory, it may be synchronous to the frame memory. The masking is executed much faster than a system processed by software.

Masking is useful for binarizing an image with a various threshold level for each area of the image. A partial area to be binarized with the same threshold are extracted by masking and then binarized. The mask pattern of the mask memory 81 is successively changed corresponding to other areas to be binarized with other thresholds. A mask pattern is generated, for example, according to the value of a Laplacian operator. The areas of high value of Laplacian are extracted and the histogram is generated for these areas. The threshold is determined by this histogram, then the areas are binarized with the threshold.

Figure 42:
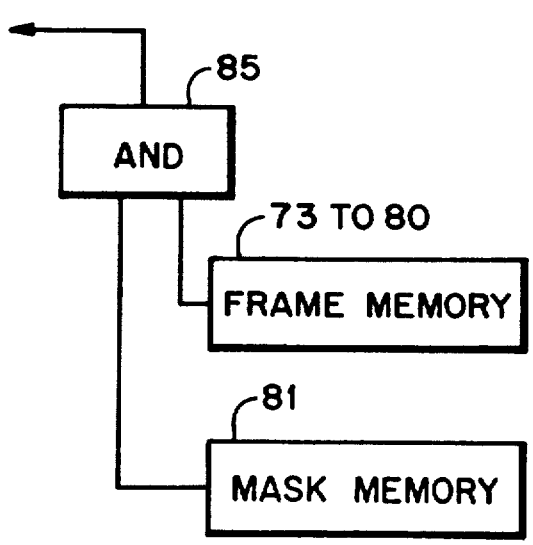
FIG. 42 shows a block diagram of the second embodiment.

The selecting means may include any construction for switching, passing, or stopping image data. The AND gate 85 shown in FIG. 42 can be applied to the selecting means. When the data in mask memory is "1" and "0" and is input to one input of the AND gate, only the image data corresponding to the data "1" in mask memory can pass through the AND gate. Therefore, an AND gate can perform as a selecting means.

Hereafter a frame memory consisting of a dual port memory is explained.

The dual port memory has a high speed serial access memory SAM together with a random access memory RAM. Data transmission between RAM and SAM and the data input/output of SAM are executed by one clock cycle. The dual port memory is preferable for displaying the processing of an image in real time.

For real time processing, the processed image should be stored in another dual port memory other than the dual port memory storing the original image data. The read/write timing of both dual port memories must be different due to a delay factor introduced by the logic, such as the computational portion. Particularly in the computational portion, the image data is delayed at least for one process time of the computational portion.

Therefore, the first and second dual port memories are driven according to a different transmission cycle and refresh cycle. It means that each dual port memory needs an independent circuit for transmission and refresh, and that the circuit of the total system becomes complicated and poor in cost performance.

As to the address designation circuit, the second dual port memory needs a different circuit than that of the first because the writing timing of the second is delayed usually by at lest one process timing of the computational portion from the reading timing of the first.

Therefore, the prior image processing system including a dual port memory was disadvantageous.

Figure 43:
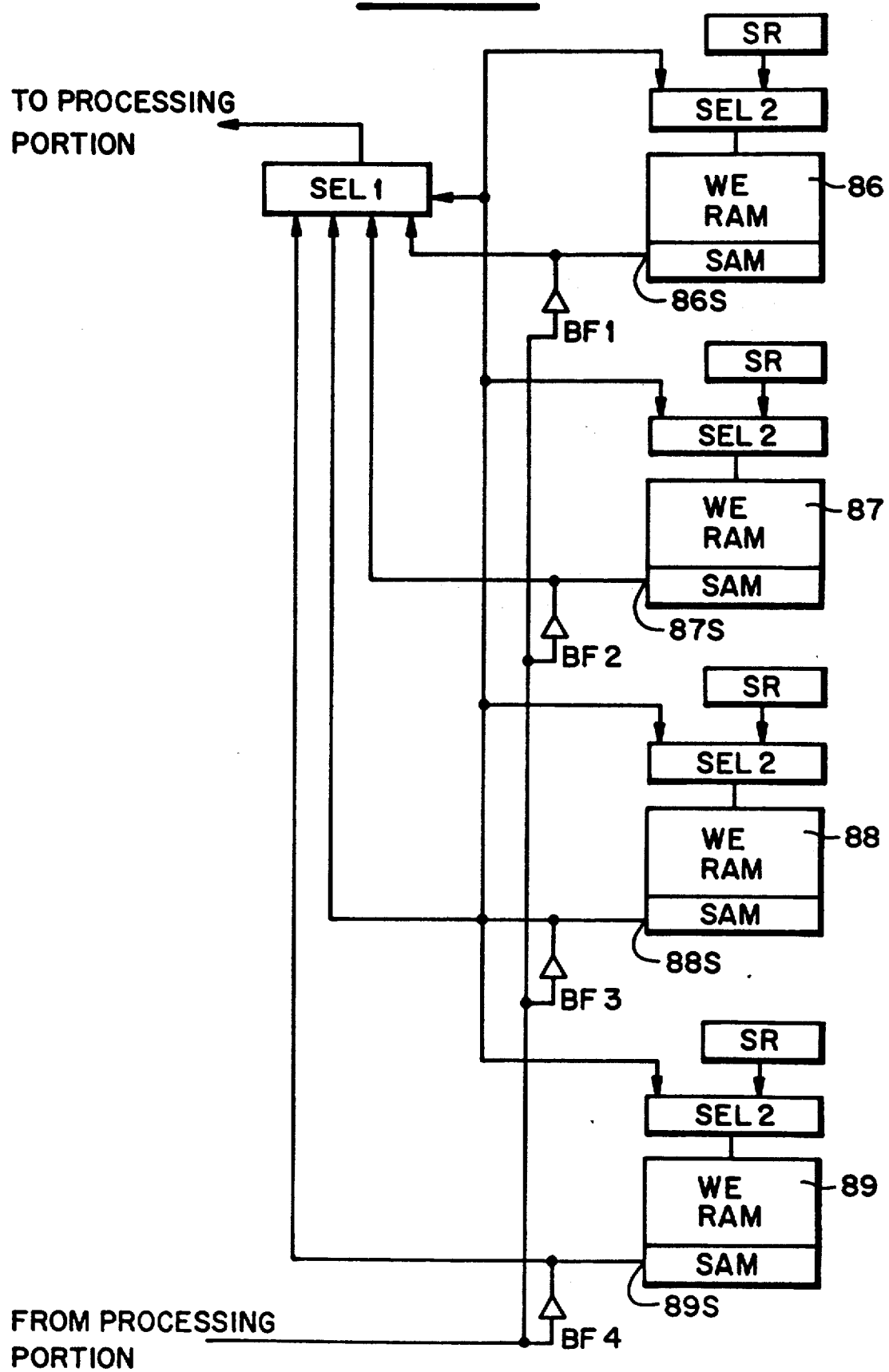
FIG. 43 shows a block diagram of a part of the structure of the image processing system.

The embodiment in FIG. 43 solves these problems.

The image processing system of FIG. 43 includes a plurality of dual port memories from 86 to 89, whose SAMs (serial access memories) have I/Os, 86S to 89S, connected to the input of a selector SEL1. The output of the selector SEL1 is transmitted to the processing portion of the system, which executes convolution processing, space filtering or other calculations or characteristic extraction. The processed image data is transmitted back to the SAM from one of the frame memories. The processed data is input through the bus buffers BF1 to BF4, to the SAMs. The bus buffers are controlled so that the I/O of the SAM is prevented from being impressed with processed data. The write enable (W) terminal of the dual port memory is connected through the selector SEL2 with the status register SR which is controlled by the MPU or CPU of the system. In the FIG. 43, the status register is provided for each of the dual port memories for easy understanding. However, just one status register may be commonly applied for all dual port memories. The bus buffer from BF1 to BF4 are controlled by the status register so as to protect the dual port memories. The serial-out enable terminal (not shown) is controlled by the status register so that the data I/O gets a high impedance and the dual port memory is protected occasionally. For example, three of the dual port memories are designated as input memories of red, green and blue frames of a color image. One of the dual port memories is designated as a work area. In total, dual port memories for five frames are provided. The designation of the frame memories can be easily changed by the selector SEL1 and the bus buffers from BF1 to BF4.

Hereafter, the system is explained in the case when the dual port memory 86 is designated as the input memory and the dual port memory 89 is designated as the output memory for storing the processed data.

The dual port memory 86 transmits one raster data from RAM to SAM successively. The data in the SAM is transmitted successively pixel by pixel through the selector SEL1, to the processing portion. The dual port memory 89 successively writes the data processed by the processing portion into the SAM. The data in SAM is transmitted to RAM when one raster data has been written in SAM. The address of RAM from where the data is transmitted to the SAM is designated in advance by one raster of that of RAM to where the data is transmitted from SAM.

The transmission timing from RAM to SAM in the dual port memory 86 is in advance of the transmission timing from SAM to RAM in the dual port memory 89 by an amount of the delay time due to the delay factor in the processing portion.

While the image processing system has usually a faculty to display the image in the memory and executes reading and writing of the SAM synchronous to the display timing of the CRT (cathode ray tube). The timing signal of the CRT has usually a horizontal blanking period during which no picture is displayed. During this period, the transmission or refreshing can be executed independently from the image displaying. The horizontal blanking is generated in every raster and the horizontal blanking of the memories 86 and 89 are shifted by the delay time above.

Figure 44:
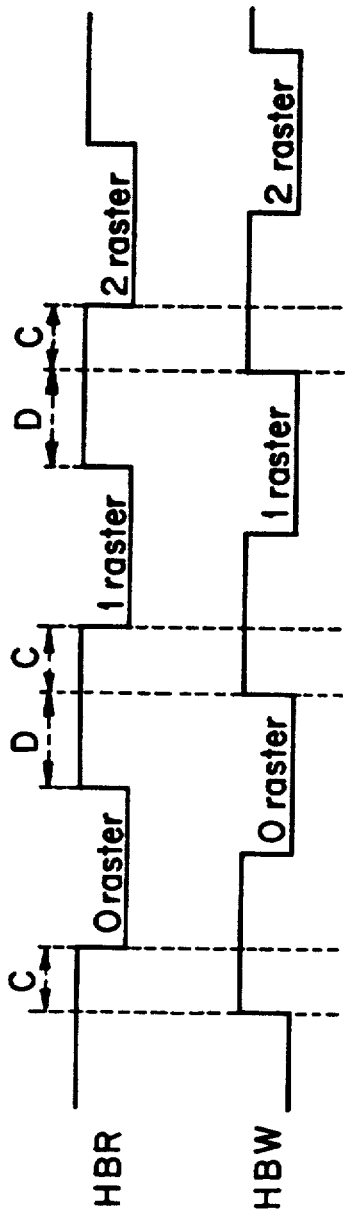
FIG. 44 shows a waveform of the timing signal of transferring and refreshing of the dual port memory.

FIG. 44 shows the horizontal blanking HBR of the timing signal of the dual port memory 86 and the horizontal blanking HBW of the dual port memory 89. The blank HBR and HBW are shifted by a delay D, but long enough to have common period C. When the transmission and refreshing are executed during the common period C, both memories 86 and 89 are commonly refreshed and that data in both memories are simultaneously transmitted without preventing displaying. Therefore, all the dual port memories are controlled in data transmission and refreshing by one common circuit. The total circuit is simplified and the production cost decreases.

Figure 45:
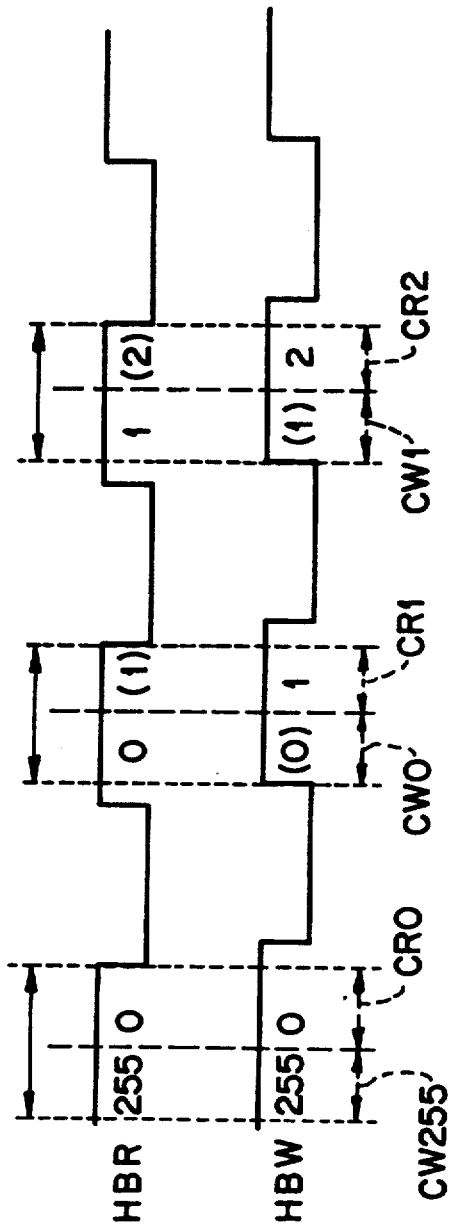
FIG. 45 shows a waveform designating address concerning the SAM of the dual port memory.

FIG. 45 shows a wave form similar to that of FIG. 44, in which the common period is enlarged for easy understanding.

In the first half of this common period, the address of RAM is designated to where the data is transmitted from SAM and in the latter half, the address of RAM from where the data is transmitted to SAM. The former address is designated as CW 255, CW0, CW1, ... and so forth and the latter address is designated as CR0, CR1, CR2, ... and so forth in FIG. 45. By the first designation, the data of the upper raster is transmitted to SAM. However, by the latter designation, the data in SAM is rewritten to the next raster data to be read. In the memory 89, the correct data is written in SAM by the first designation and the next raster data is rewritten in the first designation of the next horizontal blanking period.

The address designation is usually executed by an address counter. One common address counter can be used for every memory for input and output by increasing stepwise during the common period of the horizontal blanking. The circuit is simplified and production cost is decreased.

FIG. 46 shows another embodiment of the image processing system, comprising input portion 90 which includes various input portions 91, a frame memory 92 and a selector 93 for selecting either of the input portions 91 or the frame memory 92, and output portion 94 which includes various output portions 95 and a distributor 96 for distributing data to one of the output portions 95.

The input portion 91 may be a VTR (video tape recorder) a camera, an image scanner, a video deck, a laser disk apparatus, a CD-ROM, an optical disk apparatus, a hard-disk system, a floppy disk system, or an interface for communication or a frame memory. As far as the input portion accepts data or a signal from the image processing system, it may be employed as an output portion. In this embodiment, controller 97 is connected to the computational portion 2, converting portion 3, selector 93, distributor 96 and frame memory 92 for controlling these devices. The controller 97 is controlled by a MPU 98. The MPU 98 also processes complex calculations which the image processing system cannot perform. The share of the image processing job should be optimized because excessive processing in computational portion 2, converting portion or MPU lowers the efficiency of the image processing operation.

Although only a few exemplary embodiments of this invention have been described in detail above, those skilled in the art will readily appreciate that many modifications are possible in the exemplary embodiments without materially departing from the novel teachings and advantages of this invention.

Accordingly, all such modifications are intended to be included within the scope of this invention as defined in the following claims.

What is claimed is:

1. An image processing system, comprising:
   input means for receiving an image formed of input pixel data;
   computational means, receiving said input pixel data, for calculating a parameter indicative of image processing from said input pixel data for each predetermined convolution area of said image, said convolution area being an area on which an image processing operation will be performed, said computational means comprising:
   a) multiplication means, having a plurality of inputs, each receiving one data indicative of one pixel from said input means, and having a plurality of outputs, said multiplication means for multiplying each input by a weighting factor, and providing a weighted output for each result of multiplication;
   b) logic means, coupled to receive at least two outputs of said multiplication means and to produce an output which is a logical operation between said at least two outputs, from the group consisting of AND, OR, EX-OR, NOP, NAND, NOR, EX-NOR, NOT or combinations thereof;

c) selecting means, coupled to receive said weighted outputs of said logic means at inputs thereof, for selecting ones of said weighted outputs and coupling them to outputs of said selecting means, a connection between inputs and outputs of said selecting means being changeable, and d) operation means, having inputs coupled to outputs of said selecting means, for performing a predetermined mathematical operation on values which are coupled to its inputs by said selecting means, to produce a lesser number of outputs than a number of said inputs, and producing said parameter based thereon; and converting means for converting at least one of said parameter and said input pixel data into image processing data and for calculating an integration of said image processing data in accordance with said parameter indicative of image processing, said converting means including high speed memory means having a plurality of addresses for high speed storage of data during said conversion of said input pixel data, whereby a number of data the same as a number of addresses are simultaneously stored in said high speed memory.

2. An image processing system according to claim 1, wherein said input means comprises a first frame memory system for receiving said input pixel data.

3. An image processing system according to claim 2, wherein said first frame memory system comprise a plurality of frame memories, each of which corresponds to one pixel within said convolution area.

4. An image processing system according to claim 2, wherein said input pixel data is in serial form and further comprising convolution processing means for processing said input pixel data in said predetermined convolution area within said image to convert said input pixel data into a parallel form and for producing an output to be received by said computational means for said calculating of said parameter.

5. An image processing system according to claim 4, wherein said first frame memory system comprises a plurality of frame memories, each of which corresponds to one raster within said convolution area.

6. An image processing system according to claim 5, wherein said convolution processing means comprises a plurality of delaying means, each of which corresponds to one of said frame memories, for delaying pixel data indicative of one raster within said convolution area sufficiently for outputting simultaneously said pixel data.

7. An image processing system according to claim 4, wherein said convolution processing means comprises (a) a plurality of line memories, each of which corresponds to each raster within said convolution area, for delaying said input pixel data by a time of one raster scan and (b) a plurality of delaying means corresponding to each line memory, wherein each of said delaying means delays pixel data indicative of one raster within said convolution area sufficiently for outputting simultaneously said pixel data; wherein said convolution processing means simultaneously outputs said pixel data.

8. An image processing system according to claim 2, wherein said first frame memory system comprises a plurality of frame memories and further comprising switching means, an input to said switching means being connected to outputs of a plurality of said frame memories and said switching means selects at least one of said frame memories whose data is to be passed through said switching means.

9. An image processing system according to claim 8, further comprising a mask memory, connected to said switching means, for controlling the switching means to select one of said frame memory.

10. An image processing system according to claim 2, further comprising a second frame memory system for storing processed pixel data.

11. An image processing system according to claim 10, wherein said second frame memory system comprises a plurality of frame memories, and further comprising switching means for selecting at least one of said frame memories.

12. An image processing system according to claim 10, wherein said second frame memory system comprises a plurality of frame memories, and further comprising shifting means for shifting pixel data from said first frame memory to said second frame memory.

13. An image processing system according to claim 12, wherein said pixel data is aligned in a matrix form, said pixel data being read from said first frame memory at a read address and shifted to said second frame memory at a write address, wherein said write address of said second frame memory being preset such that said pixel data is shifted in at least one of a column direction and a row direction of said matrix form.

14. An image processing system according to claim 10, wherein each of said first and second frame memory systems comprises a plurality of dual port memories.

15. An image processing system according to claim 14, wherein horizontal blanking periods of a timing signal for displaying said image indicative of said pixel data stored in said dual port memories have a common period.

16. An image processing system according to claim 15, further comprising means for performing data transfer and refreshing for said dual port memories during said common period.

17. An image processing system according to claim 15, wherein said dual port memories each comprise a random access memory RAM, and a serial access memory SAM, and further comprising an address designating means for designating during a first portion of said common period an address in said RAM to which data is to be transferred from said SAM, and for designating during a second portion of said common period an address of said RAM from which data is to be transferred to said SAM.

18. A system as in claim 1 wherein said converting means comprises means for performing light computation having at least one input coupled to receive an output from said high speed means and an output coupled to an input to said high speed memory means.

19. An image processing system according to claim 1, wherein said computational means comprises (a) a numerical computational portion for numerically processing image information indicative of said input pixel data and (b) a status computational portion for evaluating image processing variables relating to said input pixel data.

20. An image processing system according to claim 19, said status computational portion comprising:

a pattern matching register means for storing a predetermined pattern of said convolution area;

second register means for receiving and storing said input pixel data from said input means corresponding to said convolution area; and comparing means for comparing said pixel data of said convolution area in said second register means with said stored pattern in said pattern matching register means.

21. An image processing system according to claim 20, wherein said status computational portion further comprises binarizing means for binarizing pixel data of said convolution area.

22. An image processing system according to claim 20, further comprising logic means for performing logical computations according to a pattern of said convolution area.

23. An image processing system according to claim 20, further comprising delay means for synchronizing an output of said status computational portion with an output of said numerical computational portion.

24. An image processing system according to claim 1, said converting means comprising:
a light computational portion, having an input connected to said output of said high speed memory and an output, for calculating at least a portion of said integration;
a feedback line having a first end connected to said output of said light computational portion and a second end; and
switching means having an output connected to said input of said high speed memory, a first input connected to said second end of said feedback line, and a second input connected to said computational means, said switching means selectively connecting one of said feedback line and said computational means to said input of said high speed memory to thereby provide said high speed memory with either an output of said computational means or said second end of said feedback line.

25. An image processing system according to claim 24, wherein said switching means is connected to said input means, whereby said switching means selects data from one of said feedback line and said input means.

26. An image processing system according to claim 24, further comprising:
a second switching means connected to said branch of said output of said high speed memory;
a first latch connected between said second switching means and said light computational portion;
a second latch connected between said light computational portion and said first switching means connected to said input of said high speed memory;
a second feedback line from a branch of output of said light computational portion to an input of said second switching means;
a third latch for delaying an address signal input to an address input of said high speed memory by one clock timing; and
a comparator for comparing said address signal with an output of said third latch and for generating a control signal for said second switching means.

27. An image processing system according to claim 26, further comprising a third switching means for selectively inputting one of said address signal and said output of said third latch.

28. An image processing system according to claim 26, further comprising:
a third feedback line from an output of said latch to another input of said second switching means;
a fourth latch for delaying by one clock timing said output of said third latch; and
a second comparator for comparing said output of said third latch with an output of said fourth latch and for generating a second control signal for said second switching means, whereby said second switching means is controlled by both said first and second control signals.

29. An image processing system according to claim 28, wherein said address signal is input directly to a read address input of said high speed memory and said output of said fourth latch is input to a write address input of said high speed memory.

30. An image processing system according to claim 1, further comprising switching means, connected between said input means, said converting means, and said computational means, for selectively passing one of a) an output of said input means, and b) an output of said computational means to said converting means.

31. An image processing system according to claim 1, wherein said high speed memory means comprises a first high speed memory and a second high speed memory, an input of which is connected to an output of said first high speed memory.

32. An image processing system according to claim 1, wherein said converting means comprises a plurality of converting portions connected in series for converting said parameter output from said computational means to image processing data.

33. An image processing system according to claim 1, wherein said converting means comprises a plurality of converting portions connected in parallel for converting said parameter output from said computational means to image processing data.

34. An image processing system according to claim 1, further comprising:
delay means for receiving said parameter calculated in said computational means and for holding said parameter; and
a sequential processing portion for processing each pixel data according to said parameter and an output of said delay means.

35. An image processing system as in claim 1 wherein one of said at least two outputs of said multiplication means which is connected to said logic means is a masking bit which indicates if the other output should be masked, said logic portion including means for masking said other output when said masking bit indicates that it should be masked.

36. An image processing system as in claim 1 wherein said parameter produced by said status computational portion is delayed to be output in synchronism with an output of said operation means, and said status computational portion includes a status register whose contents are changed based on which of said logical operations is to be performed.

37. A system as in claim 36 wherein said status computational portion further includes means for determining a match between said two outputs.

* * * * *